United States Patent
LaBosco et al.

(10) Patent No.: US 9,948,994 B2
(45) Date of Patent: Apr. 17, 2018

(54) TRANSMISSION OF DIGITAL AUDIO SIGNALS USING AN INTERNET PROTOCOL

(71) Applicant: Crestron Electronics, Inc., Rockleigh, NJ (US)

(72) Inventors: Mark LaBosco, New City, NY (US); Chiju Chris Choi, Paramus, NJ (US); Paul Connell, Blauvelt, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 14/714,471

(22) Filed: May 18, 2015

(65) Prior Publication Data

US 2016/0021401 A1    Jan. 21, 2016

Related U.S. Application Data

(63) Continuation-in-part of application No. 14/517,494, filed on Oct. 17, 2014, now Pat. No. 9,462,308.
(Continued)

(51) Int. Cl.
*H04N 11/02* (2006.01)
*H04N 21/63* (2011.01)
(Continued)

(52) U.S. Cl.
CPC ....... *H04N 21/631* (2013.01); *H04L 12/1886* (2013.01); *H04N 21/2347* (2013.01);
(Continued)

(58) Field of Classification Search
CPC .................................................. H04N 21/2335
(Continued)

(56) References Cited

U.S. PATENT DOCUMENTS

| 5,010,325 A | 4/1991 | Ziuchkovski |
| 6,038,232 A | 3/2000 | Jung et al. |

(Continued)

OTHER PUBLICATIONS

"Just Add Power's 2G+AVPro HD Over IP: 1080p Video, Simultaneous Stereo/5.1 Audio" http://www.cepro.com/article/just_add_powers_2gavpro_hd_ip_1080p_video_simultaneous_stereo_5.1_audio/ Feb. 2, 2015; 4 pages.
(Continued)

*Primary Examiner* — Michael Hong
(74) *Attorney, Agent, or Firm* — Crestron Electronics, Inc

(57) ABSTRACT

Described is a network system and method of use for distributing audiovisual data. The network comprises two or more audio sinks, each of the audio sinks having a corresponding audio format capability, a first source adapted to generate and transmit audiovisual data, wherein the audiovisual data includes an audio file formatted with a first audio format capability, and the at least one source being further adapted to transmit the audiovisual data to the two or more audio sinks through the network system using both an high definition multimedia interface (HDMI) and internet protocol (IP), and a first transmitter adapted to receive the transmitted audiovisual data from the first source. The first transmitter is further adapted to generate two or more transmission streams of audiovisual data, wherein each of the two or more audiovisual data transmission streams include audio data formatted according to the audio format capability of the audio sink to which it is being transmitted to.

22 Claims, 16 Drawing Sheets

Related U.S. Application Data

(60) Provisional application No. 62/025,473, filed on Jul. 16, 2014.

(51) Int. Cl.

| | | |
|---|---|---|
| *H04N 21/6405* | (2011.01) | |
| *H04N 21/2347* | (2011.01) | |
| *H04N 21/436* | (2011.01) | |
| *H04N 21/643* | (2011.01) | |
| *H04N 21/81* | (2011.01) | |
| *H04L 12/18* | (2006.01) | |
| *H04N 21/4363* | (2011.01) | |
| *H04N 21/4367* | (2011.01) | |
| *H04N 21/439* | (2011.01) | |
| *H04N 21/233* | (2011.01) | |

(52) U.S. Cl.
CPC ..... *H04N 21/4367* (2013.01); *H04N 21/4398* (2013.01); *H04N 21/43615* (2013.01); *H04N 21/43635* (2013.01); *H04N 21/6405* (2013.01); *H04N 21/64322* (2013.01); *H04N 21/8106* (2013.01); *H04N 21/2335* (2013.01)

(58) Field of Classification Search
USPC ...................................................... 348/423.1
See application file for complete search history.

(56) References Cited

U.S. PATENT DOCUMENTS

| | | | |
|---|---|---|---|
| 6,535,505 | B1 | 3/2003 | Hwang et al. |
| 6,560,496 | B1 | 5/2003 | Michner |
| 7,555,715 | B2 | 6/2009 | Randall et al. |
| 7,895,138 | B2 | 2/2011 | Schoben et al. |
| 7,970,966 | B1 | 6/2011 | Hobbs |
| 8,108,577 | B1 | 1/2012 | Hobbs |
| 8,392,826 | B2 | 3/2013 | Randall et al. |
| 8,560,753 | B1 | 10/2013 | Hobbs et al. |
| 2002/0118296 | A1 | 8/2002 | Schwab et al. |
| 2006/0023706 | A1 | 2/2006 | Varma et al. |
| 2007/0220165 | A1* | 9/2007 | Moorer ............... H04L 65/1059 709/231 |
| 2007/0255433 | A1 | 11/2007 | Choo |
| 2008/0030614 | A1 | 2/2008 | Schwab et al. |
| 2008/0159095 | A1 | 7/2008 | Shigaki |
| 2008/0226085 | A1 | 9/2008 | Takashima |
| 2008/0226103 | A1 | 9/2008 | Schobben |
| 2009/0157575 | A1 | 6/2009 | Schobben et al. |
| 2009/0192638 | A1 | 7/2009 | Van Leest et al. |
| 2010/0153097 | A1 | 6/2010 | Hotho et al. |
| 2011/0134330 | A1* | 6/2011 | Yu ........................ H04N 5/268 348/705 |
| 2012/0044985 | A1* | 2/2012 | Tao ................ H04N 21/234363 375/240.01 |
| 2012/0215952 | A1 | 8/2012 | Werner et al. |
| 2015/0110134 | A1* | 4/2015 | Kozica ............ H04N 21/44004 370/516 |

OTHER PUBLICATIONS

Analog Devices Product Sheet; "HDMI Transceiver with Fast Port Switching—ADV7623" Analog Devices, 2013; www.analog.com; 16 pages.

"Ultimate Surround Sound Guide: Different Formats Explained" http://www.digitaltrends.com/home-theater/ultimate-surround-sound-guide-different-formats-explained/ Dec. 4, 2014; Denison, Caleb; 10 pages.

"How AVB Will Impact the Future of Live Production"; AVB@IBC Conference; Eveleens, Jan; avb.reidel.net; Dec. 1, 2014; 25 pages.

First Non-Final Office Action from Related U.S. Appl. No. 14/714,625, filed Jan. 4, 2016.

First Non-Final Office Action from Related U.S. Appl. No. 14/714,696, filed Jan. 5, 2016.

Response to First Non-Final Office Action from Related U.S. Appl. No. 14/714,625 dated Jun. 28, 2016.

Response to First Non-Final Office Action from Related U.S. Appl. No. 14/714,696 dated Jun. 28, 2016.

Final Office Action from Related U.S. Appl. No. 14/714,696, filed Oct. 7, 2016.

Final Office Action from Related U.S. Appl. No. 14/714,625, filed Oct. 21, 2016.

After Final Response to Final Office Action from Related U.S. Appl. No. 14/714,696 dated Dec. 19, 2016.

Notice of Allowance from Related U.S. Appl. No. 14/714,696, filed Jan. 5, 2017.

* cited by examiner

1. Dolby Atmos (128 channels; 64x2)
2. Dolby Digital 5.1
3. Dolby Digital 6.1 EX
4. Dolby Digital 7.1 Plus (lossy)
5. Dolby Digital 7.1 TrueHD (lossless)
6. Dolby Pro Logic
7. Dolby Pro Logic II
8. Dolby Pro Logic IIX 5.1 to 6.1/7.1
9. Dolby Pro Logic IIZ 5.1 to 6.1/7.1
10. DTS 6.1 Discrete
11. DTS 6.1 Matrix
12. DTS 7.1 HD (lossy)
13. DTS 7.1 Master HD (lossless)
14. Mono
15. Stereo

FIG. 10

TRANSMISSION OF DIGITAL AUDIO SIGNALS USING AN INTERNET PROTOCOL

CROSS REFERENCE TO RELATED APPLICATIONS

Related subject matter is disclosed in co-pending U.S. Non-provisional patent application Ser. No. 14/714,625, filed May 18, 2015 and co-pending U.S. Non-provisional patent application Ser. No. 14/714,696, filed May 18, 2015, the entire contents of both of which are expressly incorporated herein by reference.

PRIORITY INFORMATION

The present application claims priority under 35 U.S.C. § 119(e) to U.S. Provisional Patent Application Ser. No. 62/025,473, filed 16 Jul. 2014, the entire contents of which are expressly incorporated herein by reference, and the present application further claims priority under 35 U.S.C. § 120 to U.S. Non-provisional patent application Ser. No. 14/517,494, filed 17 Oct. 2014, as a Continuation-in-Part application, the entire contents of which are also expressly incorporated herein by reference.

BACKGROUND OF THE INVENTION

Technical Field

Aspects of the embodiments relate to internet protocol networks, and more particularly to systems, modes, and methods for digital media transmission over internet protocol networks.

Background Art

Video distribution throughout a facility is often accomplished through an audiovisual distribution network. Audiovisual (AV) distribution networks are increasingly common installations in commercial and residential facilities. Components of an audiovisual distribution network are typically distributed throughout a facility and networked to allow video to be distributed from one or more AV sources to one or more video sinks. For example, a corporate audiovisual distribution network may comprise multiple AV sources such as media servers, personal computer devices, disc players such as digital video disc (DVD) player and Blu-ray disc players and cable boxes distributed throughout a corporate campus. Audio sinks can include televisions, displays, projectors, video cassette recorders (VCRs), digital versatile disk (DVD) recorders, computers, digital video records, and other types of display/storage/play-back devices.

Internet Protocol (IP) is a communication protocol that can be employed to transmit video throughout the audiovisual distribution network. An IP protocol audiovisual distribution network may be implemented as a local area network (LAN), a wide area network (WAN), global area network (GAN), or various combinations thereon.

In a LAN, a group of devices are connected together in a localized area to communicate with one another and share resources. Ethernet, the most widely employed LAN technology, is specified in Institute of Electrical and Electronics Engineers (IEEE) 802.3 standard. Other LAN networking technologies can include, for example, Token Ring, and fiber distributed data interface (FDDI).

A WAN is a network that covers a broad area using private or public network transports. For example, any telecommunications network that links across metropolitan, regional or national boundaries is considered a WAN. It is common for the physical layer of these kinds of networks to be implemented with category (CAT) cable, coaxial cable, optical fiber or wireless transmission media. A WAN can include two or more LANs.

A GAN refers to a networks comprised of several or more different interconnected networks that cover an unlimited geographical area. Those of skill in the art have sometimes referred to the internet as a GAN.

Traditionally, to network several devices in a LAN, network equipment such as a network switch is required. A network switch is a computer networking device that links network segments or network devices by forwarding data from one device to another. In the past, network switches and the physical interconnections between devices had limited capacity and therefore the networks had limited bandwidth. Bandwidth limits may limit the amount or type of video distributed on an IP network. In addition, there may be applications where it is desirable to provide content or digital copy protection, such as high bandwidth digital content protection (HDCP), when transmitting over IP networks.

In consideration of the above, and taking into account the demands users have made on networks to provide streaming audio video products, improvements in audio distribution are needed. Among these developments are: 10 Gbit copper Ethernet transmission is becoming commonplace; the broadcast industry has embraced video and audio over IP, and finally HDMI 1.4 is being replaced by HDMI 2.0, which is designed to have a top speed of about 18 Giga pixels per second (Gpps) to support 4 k resolution at up to 60 Hz (refresh rate). Accordingly, an improved system for distributing video and audio that can accommodate such speeds and developments, and especially for switching between audio/video sources at said rates, is desired.

Furthermore, it is known that consumer NV source components have the ability to output various audio formats. The type of audio format output by the source component depends on the source content, and the source itself. That is, some source components might only be able to output the audio in the format that it was created with, and which is stored in the source component. For example, one type of audio source component might be able to store audio data file 1 that is in surround sound 5.1, and it can only output audio data file 1 with the audio in surround sound 5.1. Further, there are source components that when connected directly to a sink, are capable of outputting the audio data file in an audio format that is compatible with the directly-connected sink capabilities. Suppose that the first device mentioned can change the format of the audio that is stored in audio data file 1; if the source recognizes the player as being capable of only using stereo audio, then the first source device can output the audio data file 1 in stereo, so that the sink connected to it can play it.

The problem of incompatible audio format devices is compounded when dealing with sources and sinks that connected over networks, and in particular Ethernet networks. While there are various distribution systems that can convert these audio (and video) formats to Ethernet compatible network formats, a problem occurs it is necessary or desired to distribute from one source to multiple sinks, each of which can have different capabilities. It is known that the majority of consumer source devices can only output a single audio format at a time. If a user want to use this content in multiple rooms (i.e., on multiple different sinks) the user is forced to use an audio format that is compatible with the equipment in all the devices that might use this content (i.e., at the lowest common format, which is generally stereo). That means a room that has high bit rate surround sound capabilities (e.g., Dolby Atmos, for example) will be limited to receiving stereo from the source device because the same content is also being used on a television in another room, which in this example can only play audio files in stereo. In other words, the lowest capable audio format takes precedent, and the audio that is output from a source with a higher or better capability will be degraded as a result. FIG. 10 illustrates a chart of the most common audio formats currently available, in alphabetical order. Those of skill in the art can appreciate that the list of the most common audio formats does not reflect an order of actual or perceived quality; that is, while many of skill in the art can agree that a surround 7.1 audio system generally sounds better than, for example, a simple stereo or mono audio signal, to some extent there is a level of subjectiveness to the "quality" of the different audio formats. But, what can be objectively measured is the bit rate, or bandwidth requirements that the different audio formats shown in FIG. 10 entail.

Accordingly, there is a need for an audiovisual distribution network that efficiently utilizes IP communication protocol and incorporates a system and method for transporting a plurality of audio formats to satisfy different capabilities at different users of the audio files.

SUMMARY OF THE INVENTION

It is an object of the embodiments is to substantially solve at least the problems and/or disadvantages discussed above, and to provide at least one or more of the advantages described below.

It is therefore a general aspect of the embodiments to provide systems, methods, and modes for transporting a plurality of audio formats to satisfy different capabilities at different users of the audio files that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to a first aspect of the embodiments, a network system (1100) for distributing audiovisual data is provided, comprising one or more audio sinks (110), each of the one or more audio sinks having a corresponding audio format capability, a first source (102) adapted to generate and output audiovisual data, wherein the audiovisual data includes an audio stream formatted according to a first audio format capability, and wherein the first source is further adapted to output the audio stream according to a first transmission protocol, and a first transmitter (104) adapted to receive the outputted audio stream from the first source, and wherein the first transmitter is further adapted to generate one or more audio streams and transmit the same using an internet protocol (IP), and wherein each of the one or more generated audio streams include audio data formatted according to an audio format capability compatible with the audio format capability of the audio sink to which it is being transmitted to.

According to the first aspect of the embodiments, the network system is an Ethernet network system, and the network system further comprises a switch (106) adapted to receive the one or more audio streams, and wherein the switch is further adapted to be directed to transmit the received one or more audio streams to the one or more audio sinks. According to the first aspect of the embodiments, the audio formats are selected from the group consisting of Dolby Atmos (128 channels; 64×2), Dolby Digital 5.1, Dolby Digital 6.1 EX, Dolby Digital 7.1 Plus (lossy), Dolby Digital 7.1 TrueHD (lossless), Dolby Pro Logic, Dolby Pro Logic II, Dolby Pro Logic IIX 5.1 to 6.1/7.1, Dolby Pro Logic IIZ 5.1 to 6.1/7.1, DTS 6.1 Discrete, DTS 6.1 Matrix, DTS 7.1 HD (lossy), DTS 7.1 Master HD (lossless), Mono, and Stereo audio formats.

According to the first aspect of the embodiments, the first transmission protocol is one of a high definition multimedia interface (HDMI) transmission protocol, a DisplayPort transmission protocol, and an Sony/Philips digital interface format (S/PDIF) transmission protocol, and wherein the first transmission protocol uses an advanced encryption standard (AES) as an encryption protocol. Still further according to the first aspect of the embodiments, the transmitter is further adapted to determine an audio format capability for each of one or more audio sinks that can receive audio streams from the transmitter, and wherein the transmitter is still further adapted to interrogate each of the one or more audio sinks that can receive audio streams from the transmitter as to their respective audio format capability.

According to the first aspect of the embodiments, the transmitter is still further adapted to receive a communication from each of the one or more audio sinks as to their respective audio format capability, and wherein the transmitter is further adapted to generate and transmit a first audio stream formatted according to a first audio format capability, and wherein the first audio format capability is the same audio format capability as was generated and output by the first source.

According to the first aspect of the embodiments, the transmitter is still further adapted to generate and transmit a second audio stream formatted according to a second audio format capability, and wherein the second audio format capability is a different audio format capability as was generated and output by the first source.

According to a second aspect of the embodiments, a method (1400) for distributing audiovisual data in a network is provided comprising generating and outputting an audio stream formatted according to a first audio format capability from a source (1402) using a first transmission protocol, receiving the audio stream at a transmitter, generating (1406) one or more audio streams based on the received audio stream by the transmitter, and transmitting (1408) the one or more audio streams by the transmitter using an internet protocol (IP), wherein each of the one or more audio streams include audio data formatted according to an audio format capability compatible with an audio format capability of the audio sink to which it is being transmitted to. According to the second aspect of the embodiments, the method further comprises determining (1404), by the transmitter, an audio format capability for each of one or more audio sinks that can receive audio streams from the transmitter.

According to the second aspect of the embodiments, the step of determining comprises interrogating each of the one or more audio sinks that can receive audio streams from the transmitter as to their respective audio format capability, and further according to the second aspect the step of determining comprises receiving a communication from each of the one or more audio sinks as to their respective audio format capability.

According to the second aspect of the embodiments, the method further comprises receiving, at a switch (106), the transmitted one or more audio streams of an audio format capability compatible with an audio format capability of the audio sink to which it is being transmitted to, at a switch (106), wherein the switch is adapted to transmit the received one or more audio streams to one or more receivers (108), receiving the one or more audio streams at respective one or more receivers, wherein each of the respective one or more receivers is adapted to forward the received audio streams to an associated audio sink (110), and receiving the audio stream at the associated audio sink.

Still further according the second aspect of the embodiments, the network is an Ethernet network, and the audio formats are selected from the group consisting of Dolby Atmos (128 channels; 64×2), Dolby Digital 5.1, Dolby Digital 6.1 EX, Dolby Digital 7.1 Plus (lossy), Dolby Digital 7.1 TrueHD (lossless), Dolby Pro Logic, Dolby Pro Logic II, Dolby Pro Logic IIX 5.1 to 6.1/7.1, Dolby Pro Logic IIZ 5.1 to 6.1/7.1, DTS 6.1 Discrete, DTS 6.1 Matrix, DTS 7.1 HD (lossy), DTS 7.1 Master HD (lossless), Mono, and Stereo audio formats.

According to the second aspect of the embodiments, the first transmission protocol is one of a high definition multimedia interface (HDMI) transmission protocol, a DisplayPort transmission protocol, and an Sony/Philips digital interface format (S/PDIF) transmission protocol, and the first transmission protocol uses an advanced encryption standard (AES) as an encryption protocol.

Still further according to the second aspect of the embodiments, the step of transmitting comprises transmitting a first audio stream formatted according to a first audio format capability, and wherein the first audio format capability is the same audio format capability as was generated and output by the first source.

According to the second aspect of the embodiments, the step of transmitting comprises transmitting a second audio stream formatted according to a second audio format capability, and wherein the second audio format capability is a different audio format capability as was generated and output by the first source.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
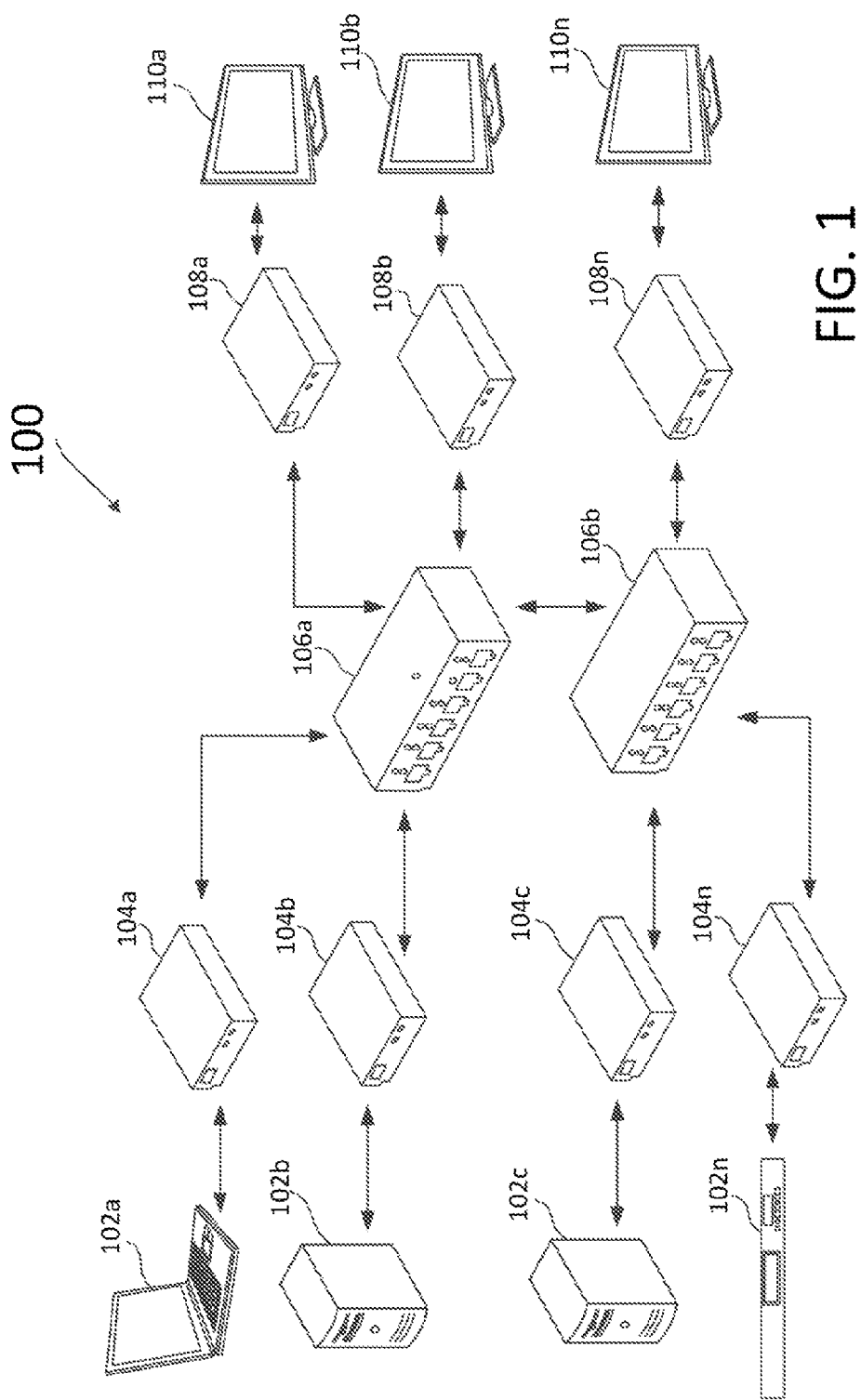

FIG. 1 illustrates an audiovisual distribution network comprising multiple audiovisual sources, transmitters, network switches, receivers, and audiovisual sinks according to an embodiment.

Figure 2:
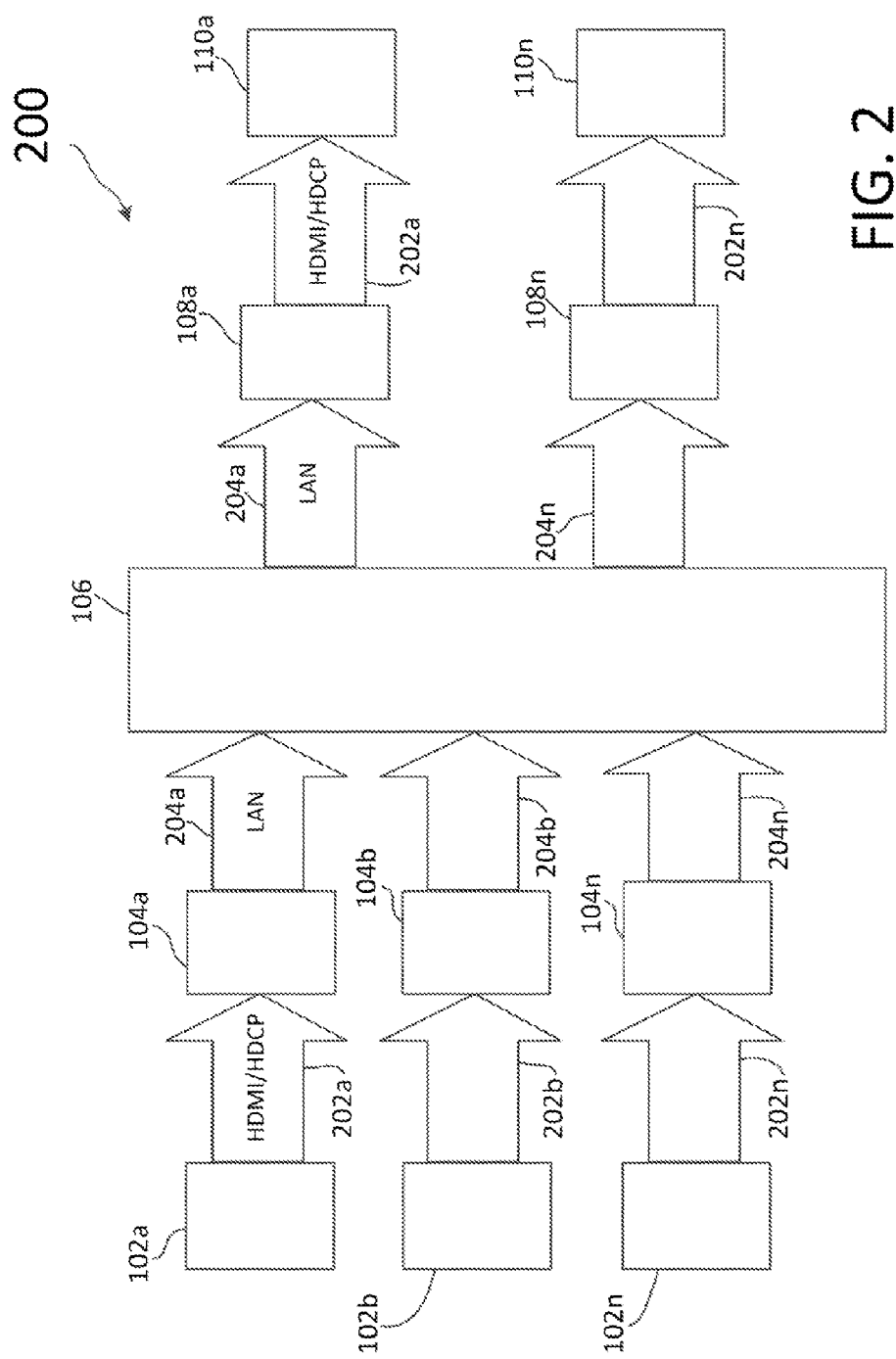

FIG. 2 illustrates a physical connectivity block diagram of the audiovisual distribution network shown in FIG. 1 according to an embodiment.

Figure 3:
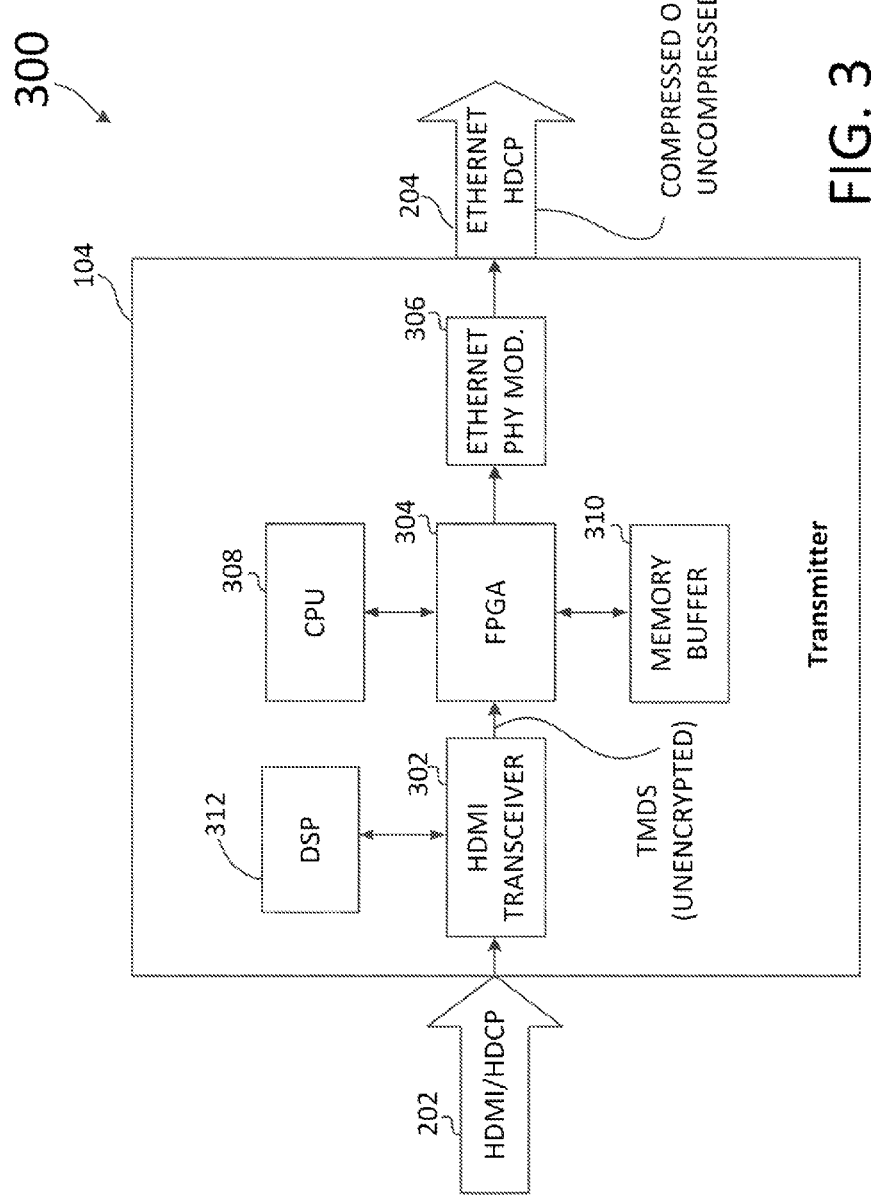

FIG. 3 illustrates a block diagram of a transmitter for use with the audiovisual network of FIG. 1 according to an embodiment.

Figure 4:
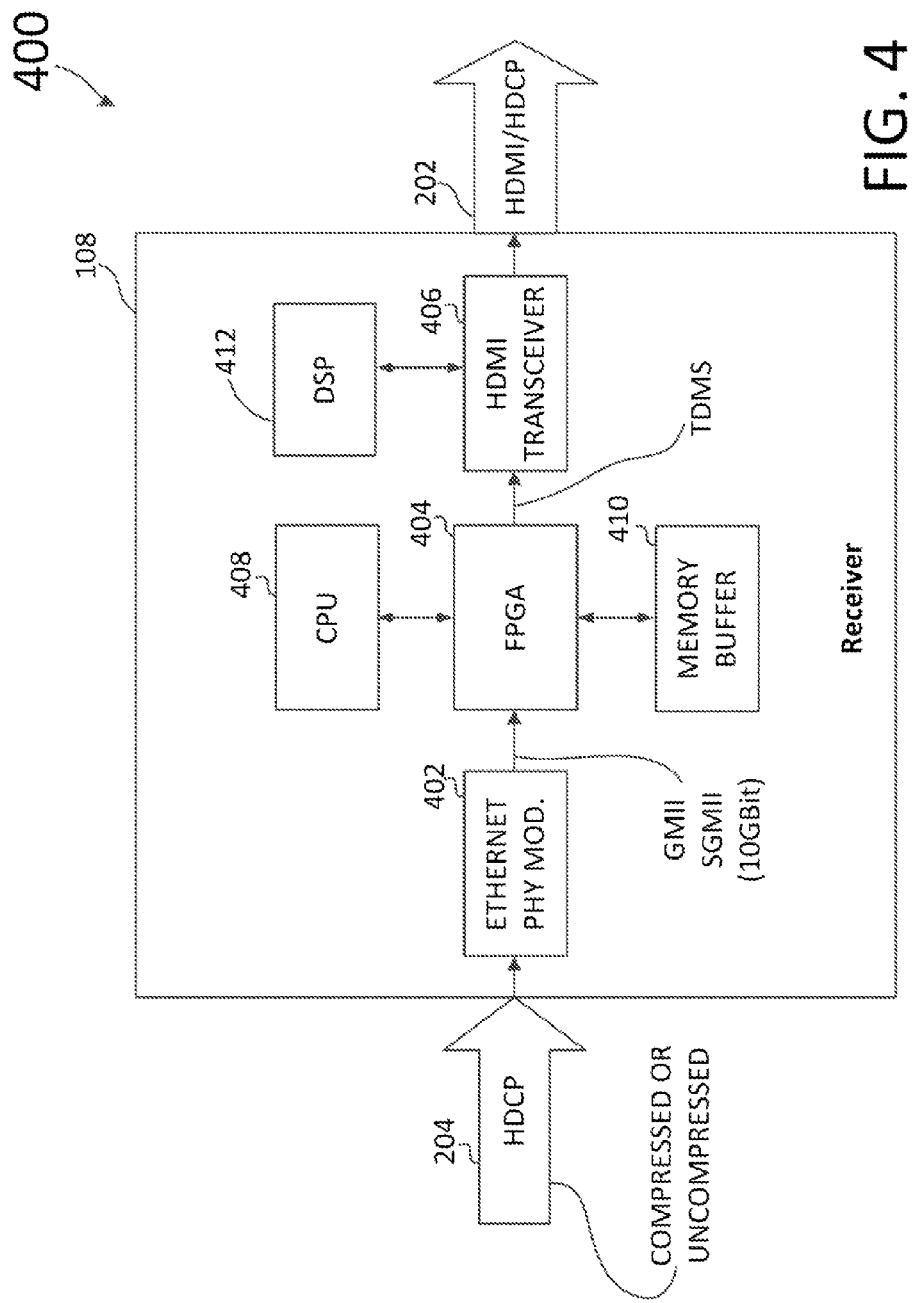

FIG. 4 illustrates a block diagram of a receiver for use with the audiovisual network of FIG. 1 according to an embodiment.

Figure 5:
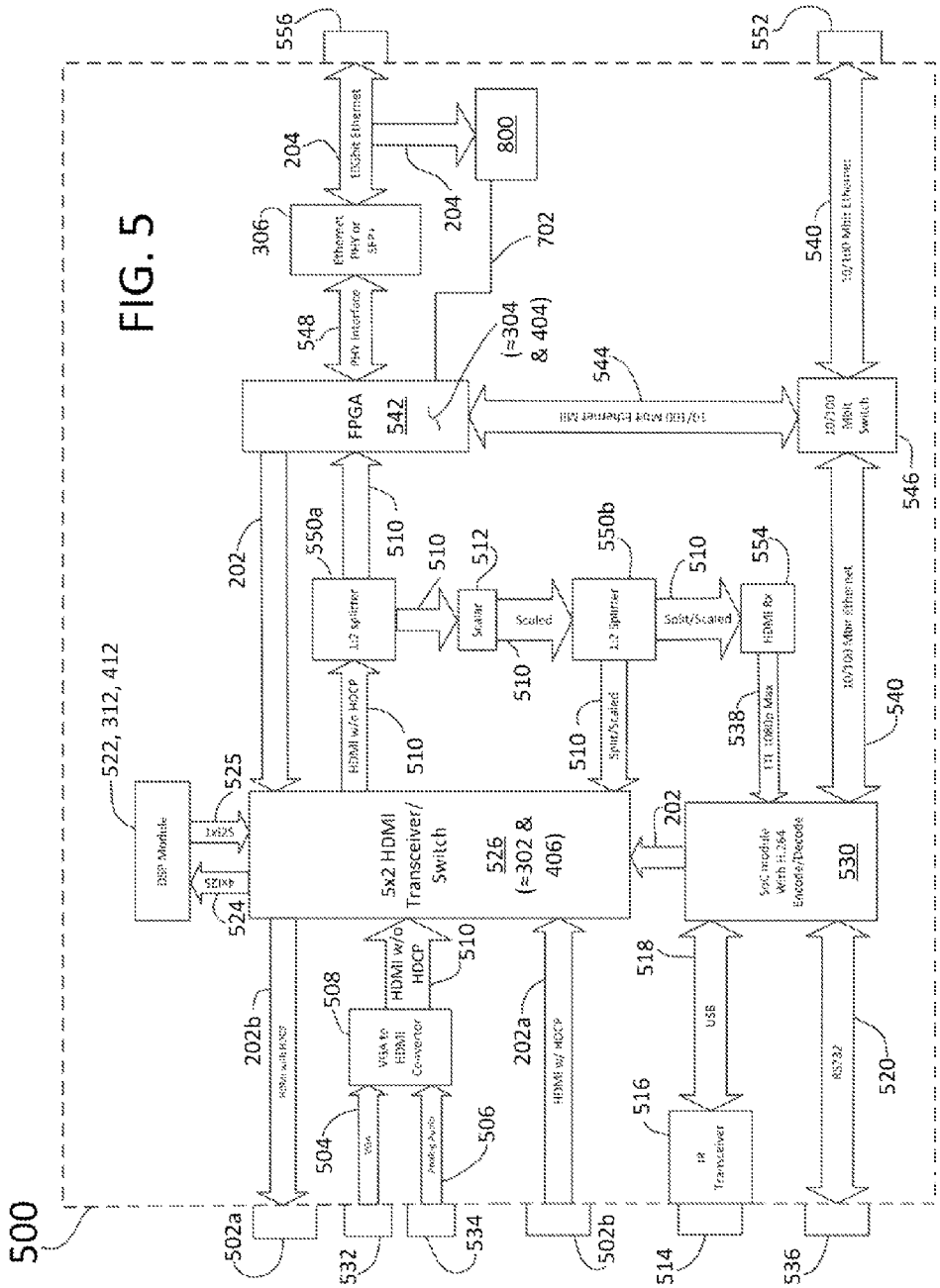

FIG. 5 illustrates a functional block diagram of a transceiver device that can be used as both the transmitter as shown in FIG. 3 and the receiver as shown in FIG. 4 for use with the audiovisual network of FIG. 1 according to an embodiment.

Figure 6:
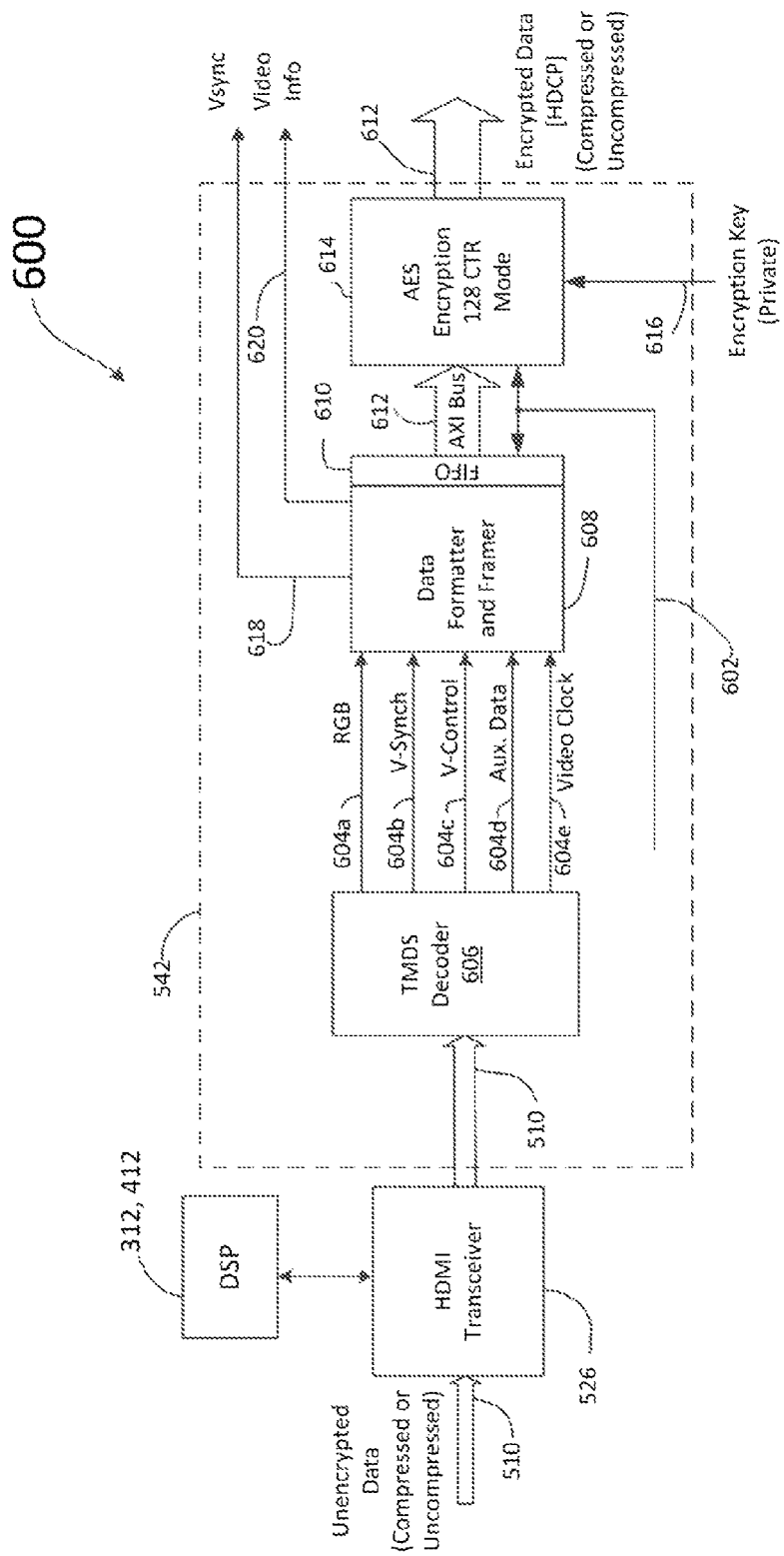

FIG. 6 illustrates a detailed functional block diagram of first portion processing functions of the transceiver device as shown in FIG. 5 according to an embodiment.

Figure 7:
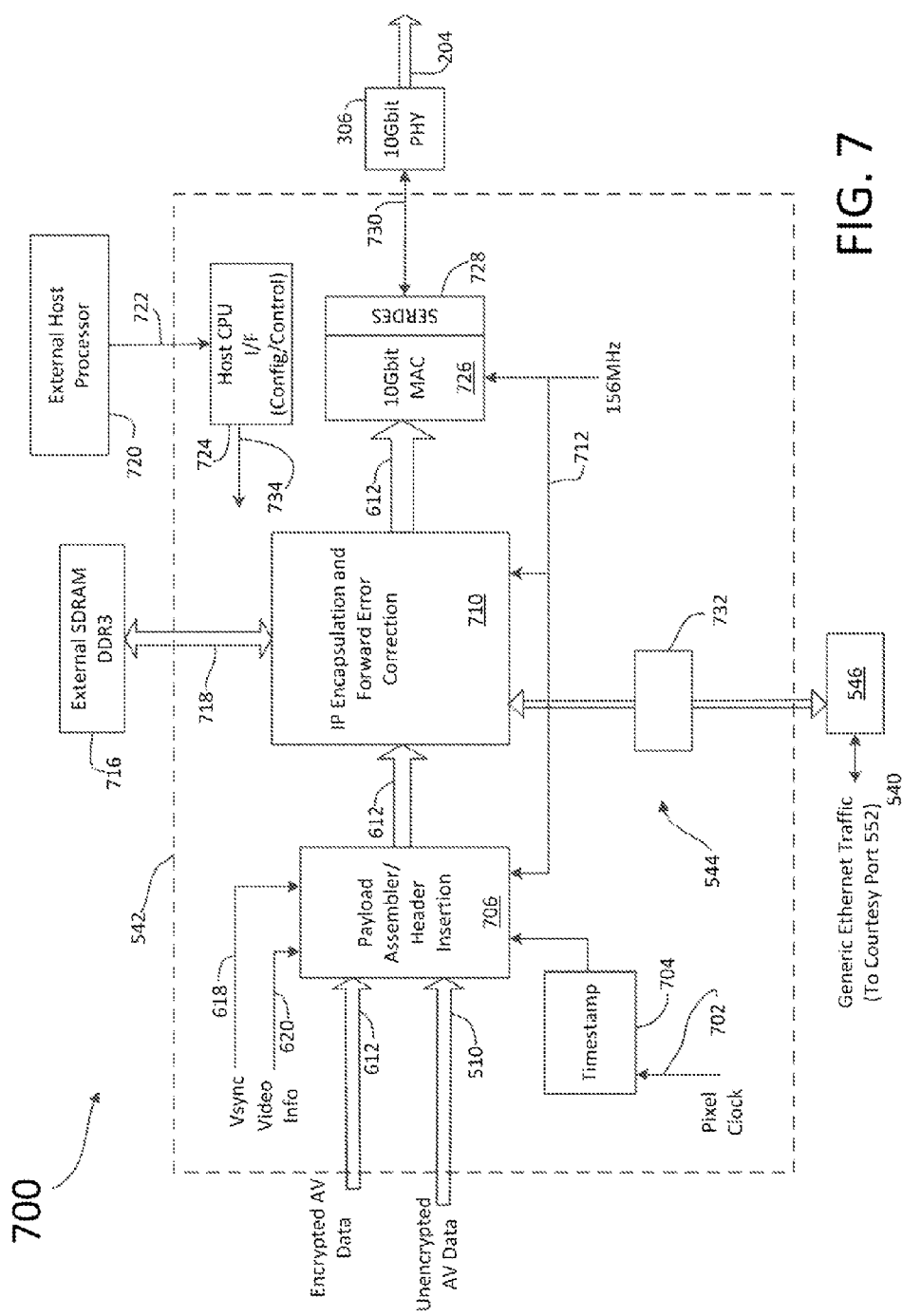

FIG. 7 illustrates a detailed functional block diagram of second portion processing functions of the transceiver device as shown in FIG. 5 according to an embodiment.

Figure 8:
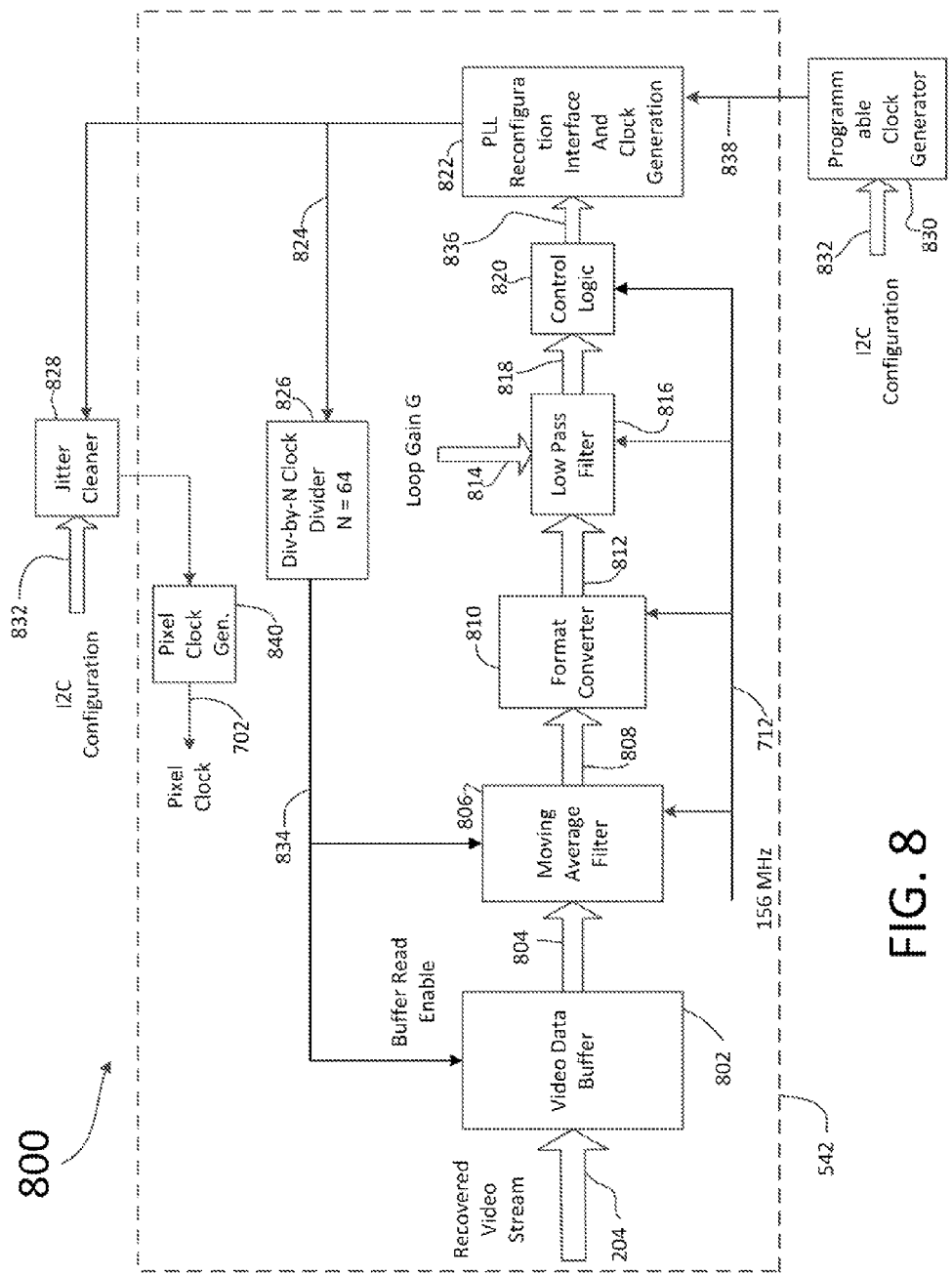

FIG. 8 illustrates a detailed functional block diagram of a clock recovery portion of the transceiver device as shown in FIG. 5 according to an embodiment.

Figure 9:
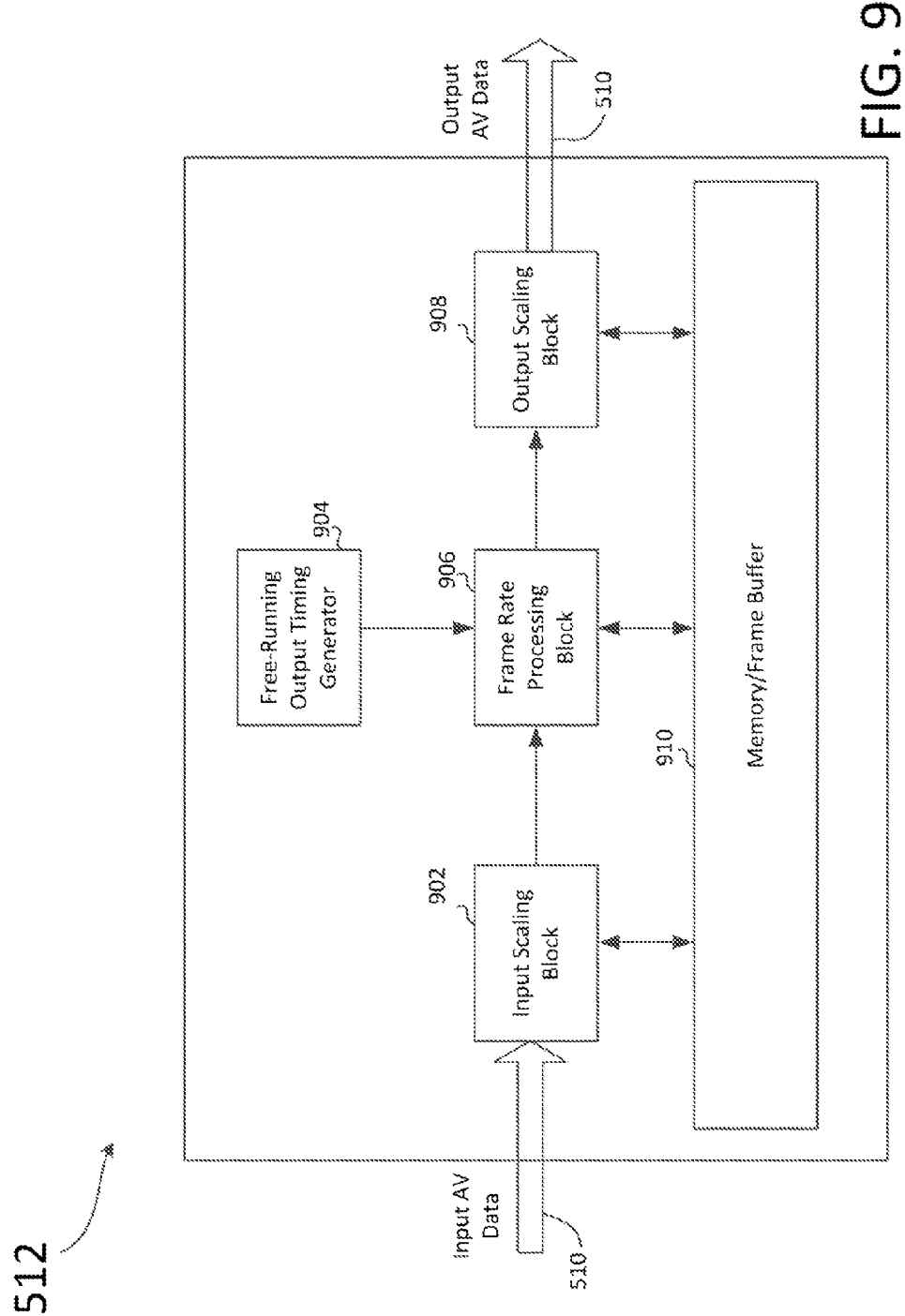

FIG. 9 illustrates a functional block diagram of a scaler device that is used in the transceiver device of FIG. 5 according to an embodiment.

FIG. 10 illustrates a list of different audio formats in alphabetical order.

Figure 11:
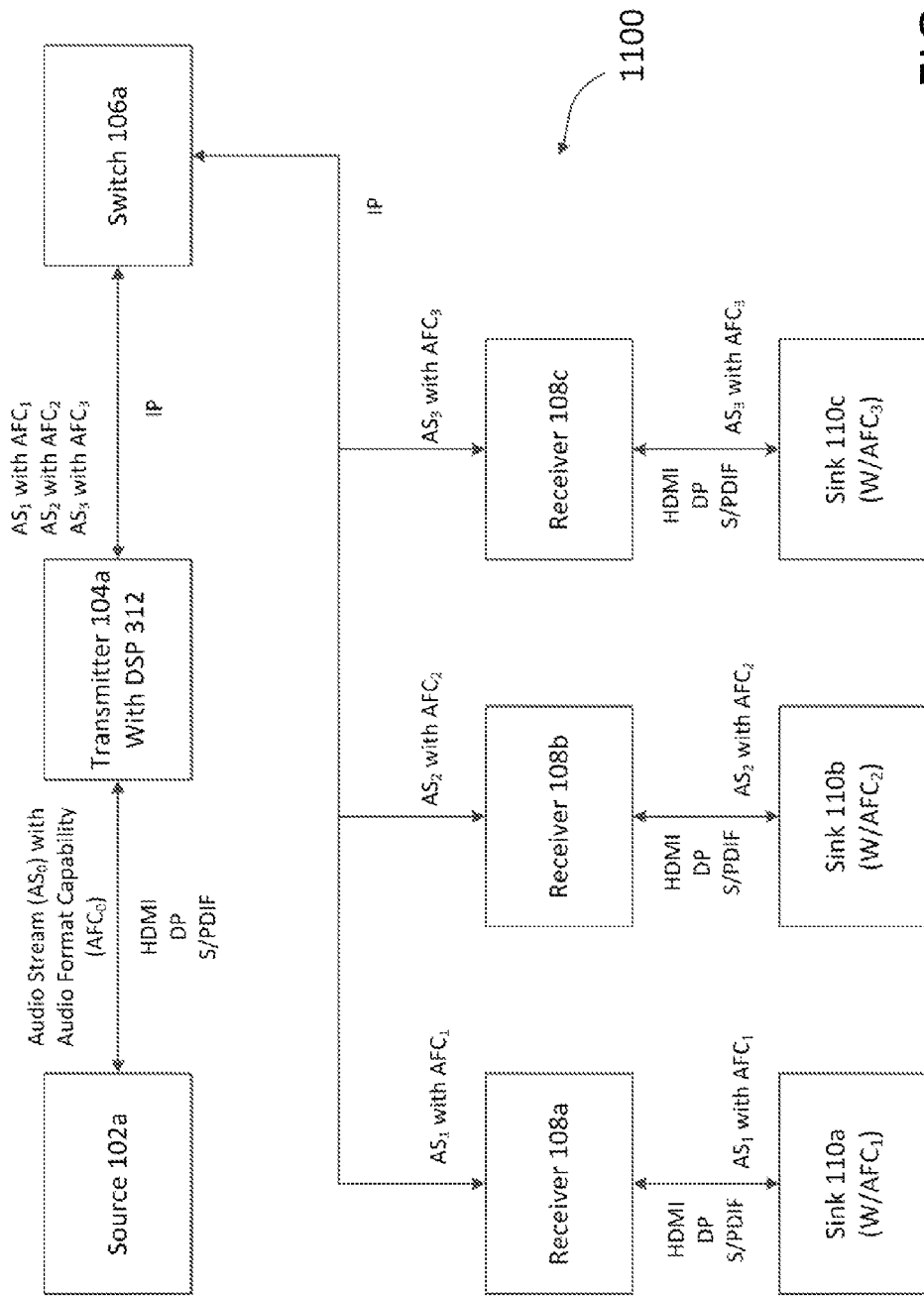

FIG. 11 illustrates a network for transmitting multiple streams of formatted audio data such that each stream of formatted data is matched to an intended audio sink according to an embodiment.

Figure 12:
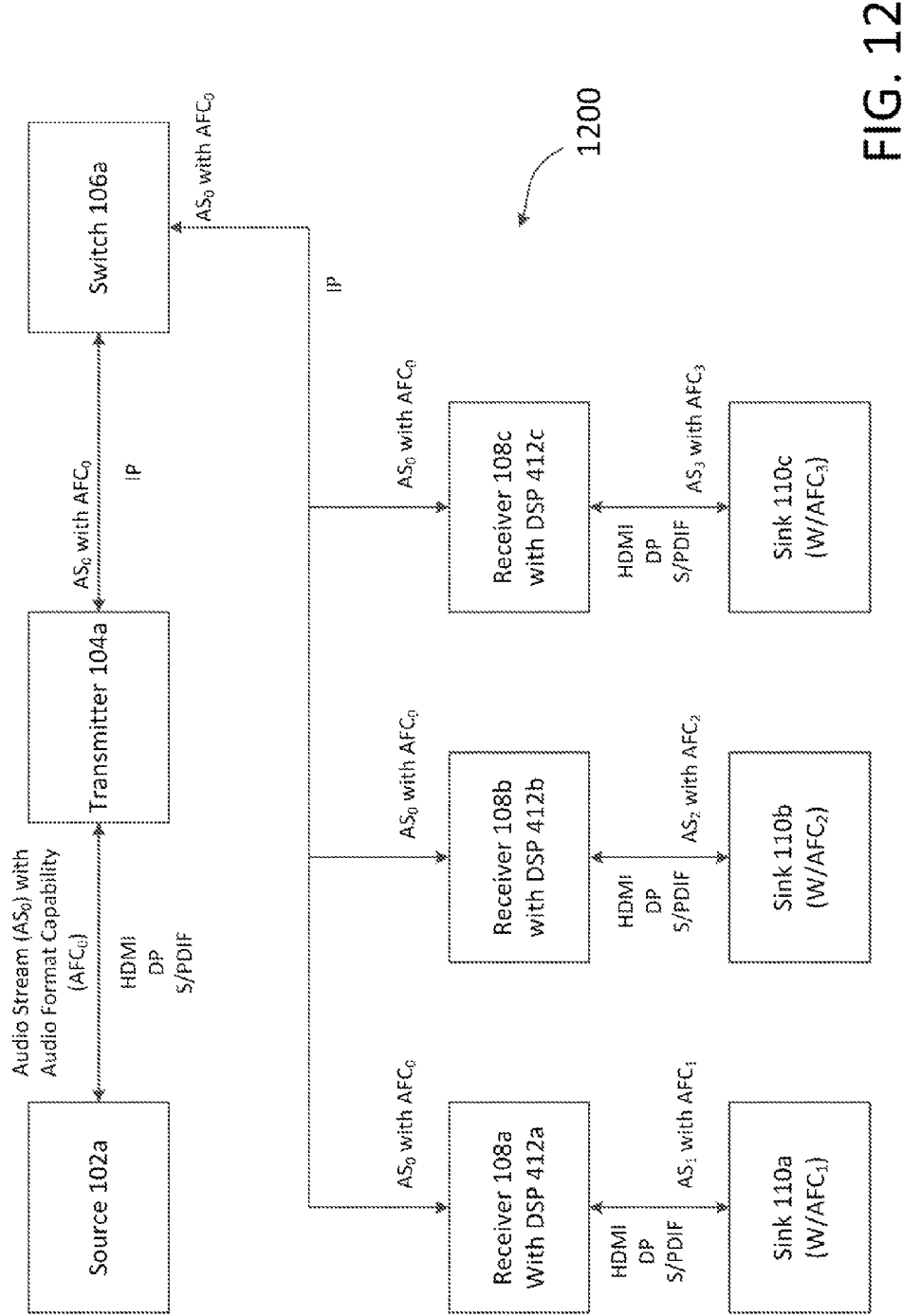

FIG. 12 illustrates a network for transmitting a single stream of formatted audio data such that the stream can be converted to an audio data format that is matched to an intended audio sink by a receiver associated with the sink according to an embodiment.

Figure 13:
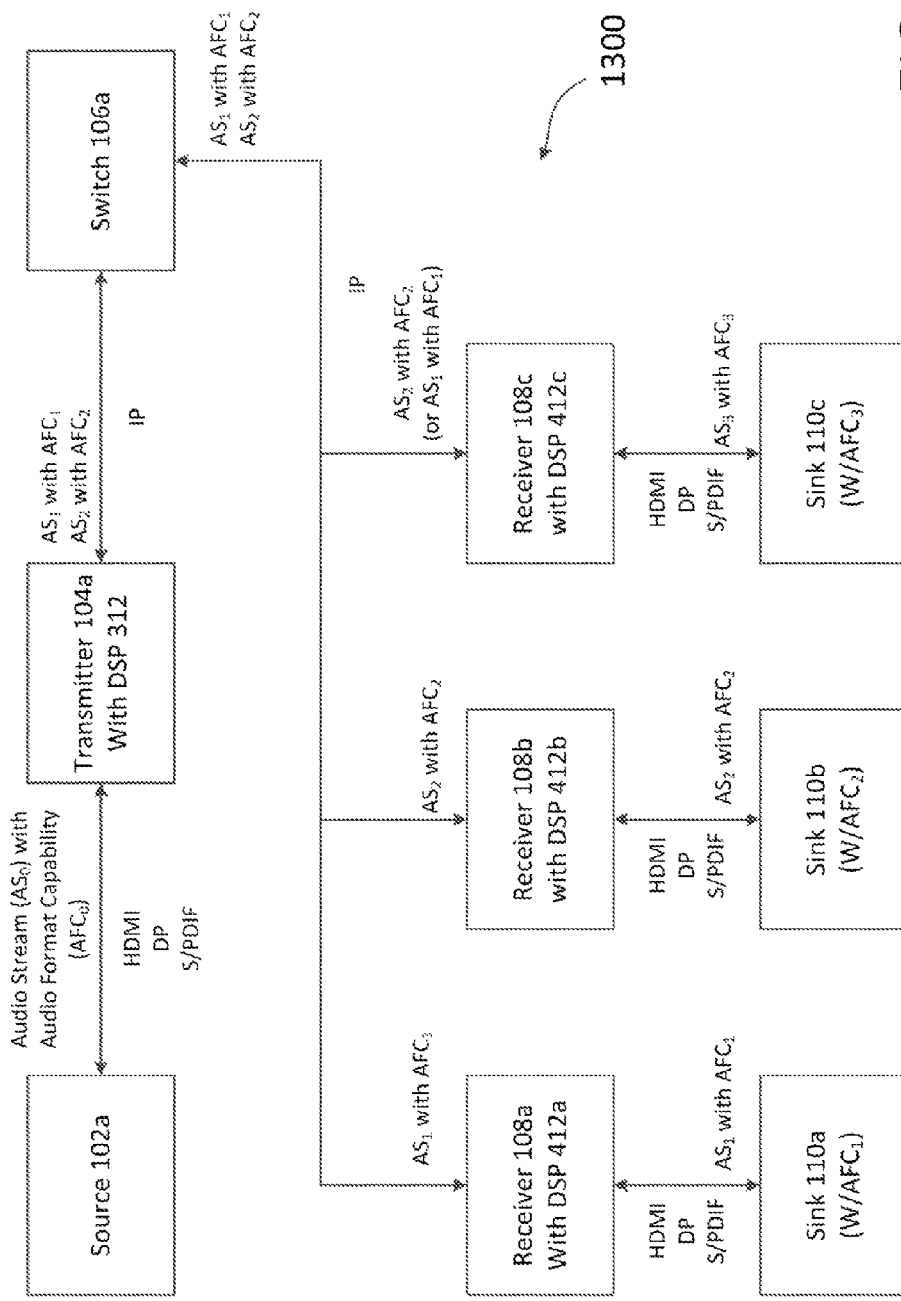

FIG. 13 illustrates a network for transmitting multiple streams of formatted audio data such that each stream of formatted data can be matched to an intended audio sink and one or more of the transmitted streams can be converted to an audio format that is matched to an intended audio sink by a receiver associated with the sink according to an embodiment.

Figure 14:
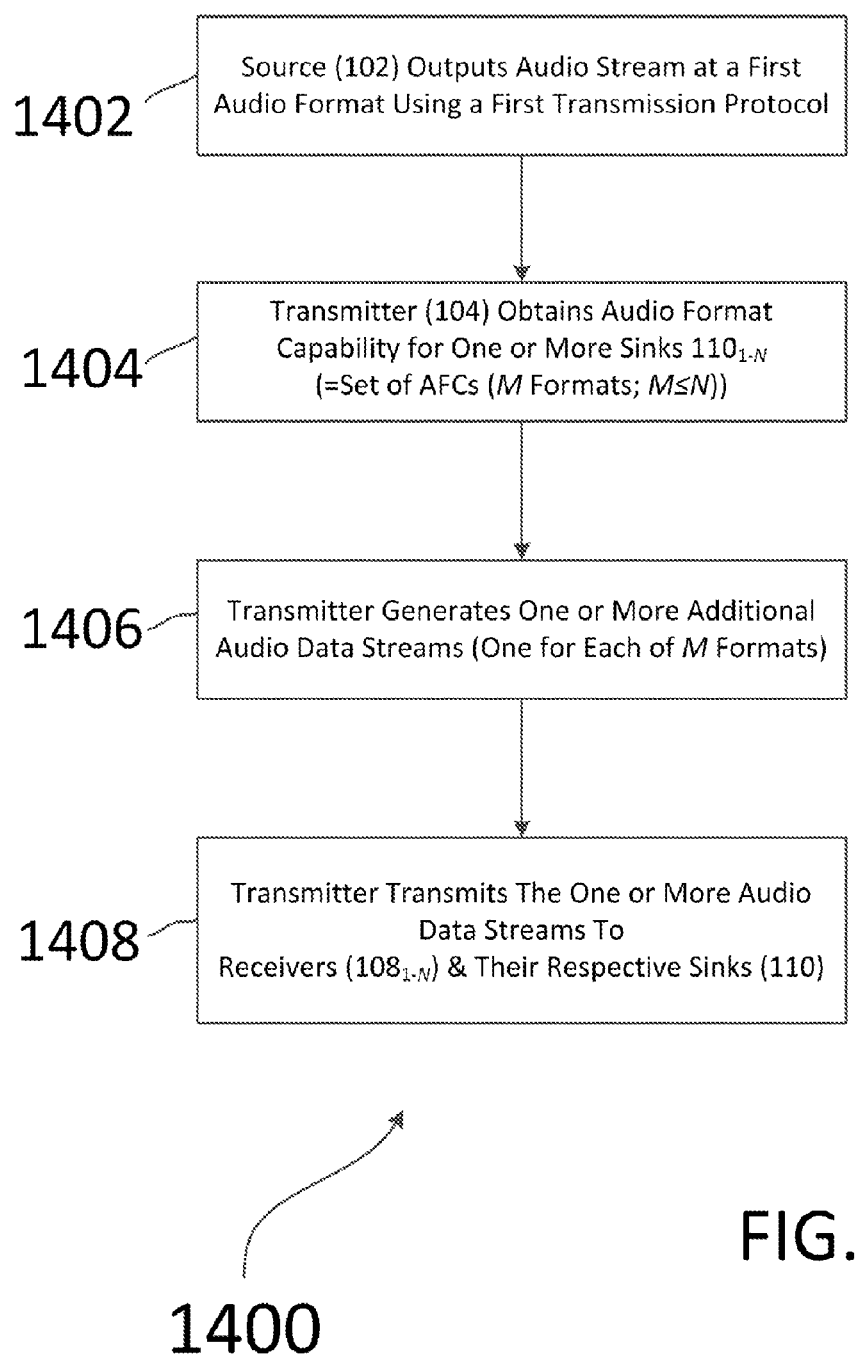

FIG. 14 illustrates a flow chart of a method for distributing one or more audio files in an audio stream using an internet protocol in the network of FIG. 11 based on an audio format capability to one or more audio sinks according to an embodiment.

Figure 15:
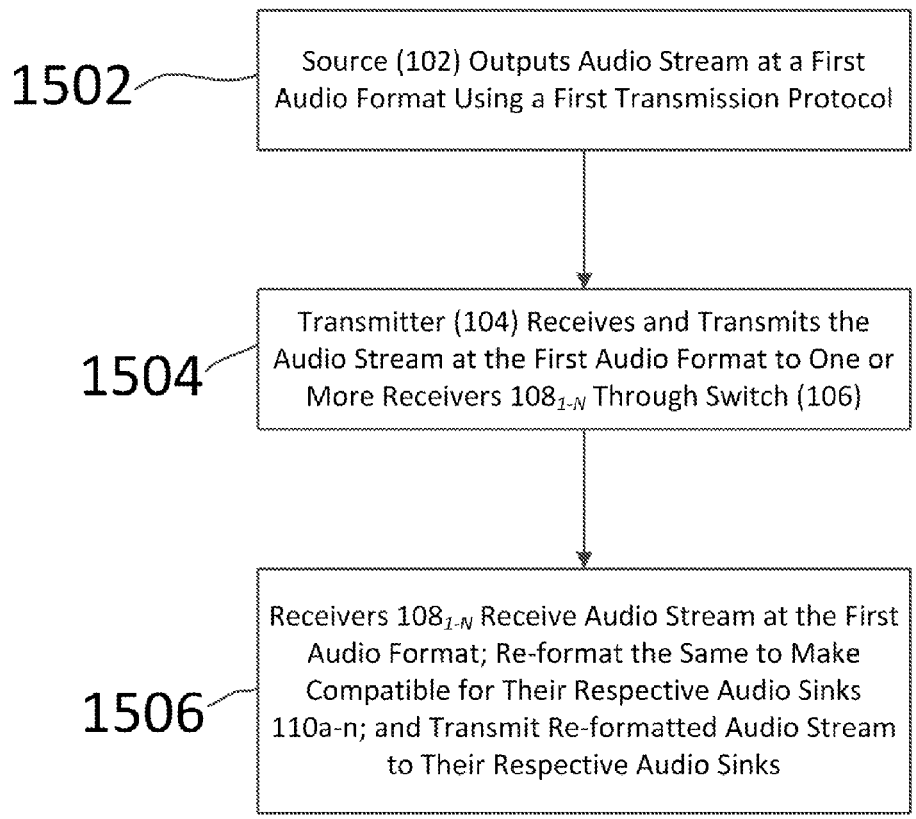

FIG. 15 illustrates a flow chart of a method for distributing one or more audio files using an internet protocol in the network of FIG. 12 based on an audio format capability to one or more audio sinks 110 according to an embodiment.

Figure 16:
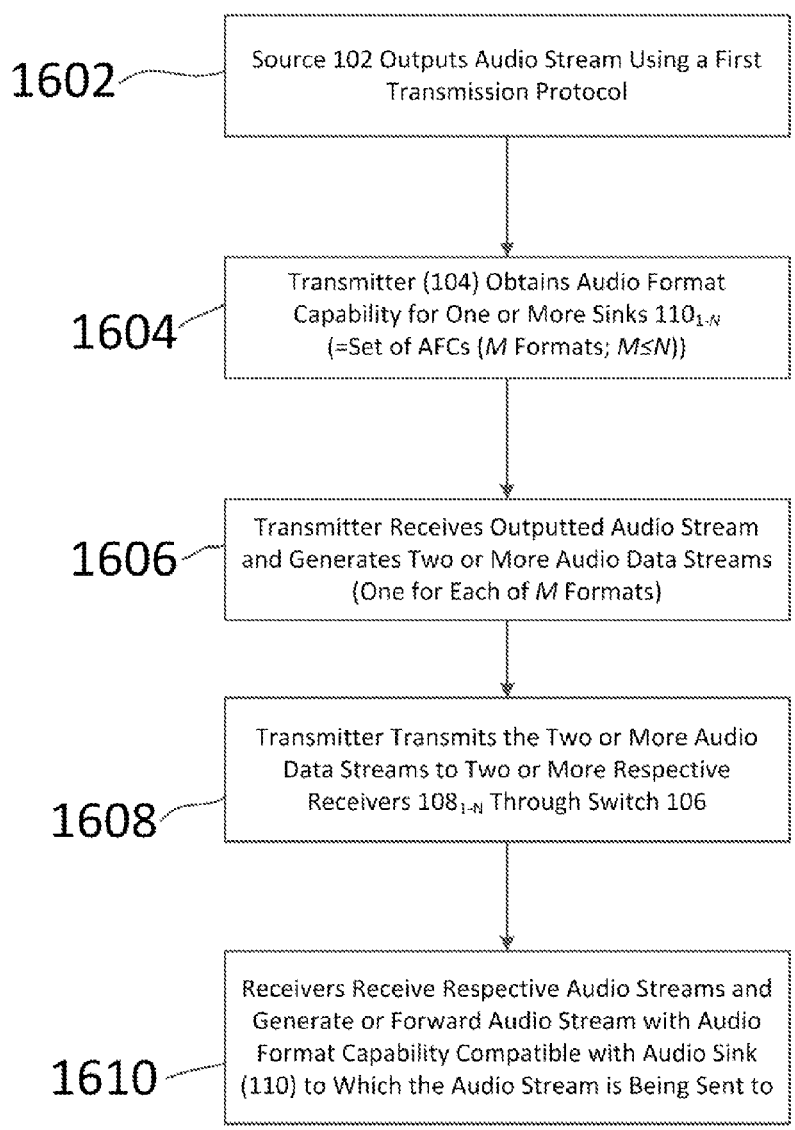

FIG. 16 illustrates a flow chart of a method for distributing two or more audio files using an internet protocol in the network of FIG. 13 based on an audio format capability to one or more audio sinks 110 according to an embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of an audiovisual data distribution systems company, so it is to be understood that generally the concepts discussed herein are applicable to various subsystems and not limited to only a particular audiovisual data distribution device or class of devices, such as digital media data distribution systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

List of Reference Numbers for the Elements in the Drawings in Numerical Order

The following is a list of the major elements in the drawings in numerical order.
100 Audiovisual Distribution Network (AV NW)
102 Audiovisual Source (Source)
104 Transmitter
106 Network Switch (Switch)
108 Receiver
110 Audiovisual Sink (Sink)
200 Network 100 Physical Connectivity Block Diagram
202 High Definition Multimedia Interface (HDMI) with High-bandwidth Digital Content Protection (HDCP 1.x) Protected Interface (HDMI/HDCP Interface)
204 Category-5 (Cat-5) Copper/Fiber Local Area Network (LAN) with HDCP 2.x Protected Interface (LAN Interface)
300 Transmitter Block Diagram
302 Transmitter HDMI Transceiver (HDMI Transceiver)
304 Uncompressed Packet Formatter Field Programmable Gate Array (Packet Formatter FPGA)
306 Transmitter 10 Gbit Ethernet PHY Module
308 Transmitter Central Processing Unit (CPU)
310 Transmitter Memory Buffer (Memory Buffer)
312 Transmitter Digital Signal Processor (Transmitter DSP)
400 Receiver Block Diagram (Receiver)
402 Receiver Ethernet PHY Module (Ethernet PHY)
404 Packet Decoder FPGA
406 Receiver HDMI Transceiver (HDMI Transceiver)
408 Receiver Central Processing Unit (CPU)
410 Receiver Memory Buffer (Memory Buffer)
412 Receiver Digital Signal Processor (Receiver DSP)
500 Block Diagram Transceiver Device (Transceiver)
502 HDMI Port
504 Video Graphics Array (VGA) Interface
506 Analog Audio Interface
508 VGA-to-HDMI Converter
510 HDMI—Transition Minimized Differential Signaling (TMDS) without HDCP Interface (HDMI w/o HDCP Interface)
512 Scaler
514 Infra-red (IR) Port
516 Infra-red Transceiver
518 Universal Serial Bus (USB) Interface
520 RS 232 Interface
522 Digital Signal Processor (DSP) Module
524 4×I$^2$S (Inter IC Source) Interface
525 1×I$^2$S Interface
526 5×2 HDMI Transceiver Switch (HDMI Transceiver)
530 System-on-Chip (SoC) Module
532 VGA Port
534 Analog Audio Port
536 RS232 Port
538 Transistor-Transistor Logic (TTL) 1080 p Max Interface
540 10/100 Mbit Ethernet Interface
542 Field Programmable Gate Array (FPGA)
544 10/100 Mbit Ethernet Media Independent Interface (MII)
546 10/100 Mbit Switch
548 PHY Interface
550 Splitter
552 Ethernet Courtesy Port
554 HDMI Converter Module
556 10 Gb Ethernet Port
600 First Portion Processing Block of FPGA 542 of Transceiver 500 (First Portion Processing Block)
602 Advanced Extensible Interface (AXI) Clock
604a Separate Image Content Data Signals (RGB)
604b Video Synchronization Signal
604c Video Control Signal
604d Auxiliary Data Signal
604e Video Clock Signal
606 TMDS Decoder
608 Data Formatter and Framer
610 First-In-First-Out (FIFO) Buffer
612 64 Bit Advanced Extensible Interface (AXI) Bus
614 Advanced Encryption Standard (AES) Encryption Module
616 Encryption Key
618 Video Synchronization (Vsync) Signal
620 Video Information (Video Info) Signal
700 Second Portion Processing Block of FPGA 542 of Transceiver 500 (Second Portion Processing Block)
702 Pixel Clock
704 Timestamp Module
706 Payload Assembler/Header Insertion (Payload Assembler) Module
710 IP Encapsulation and Forward Error Correcting (FEC) Device (IP Encoder)
712 156 MHz Clock
716 External Random Access Memory (RAM)
718 External RAM Databus
720 External Host Processor
722 Processor Bus
724 Host Central Processing Unit (CPU) Interface
726 10 Gigabit (10 Gbit) Ethernet media access controller (MAC) (10 Gbit Ethernet MAC)
728 Serializer/De-serializer (SERDES)
730 Encapsulated and Serialized AV Data Output 732 Media Independent Interface (MII) to Memory Mapped Interface (MMI) (MII-to-MMI) Module
734 Interface
800 Phase Lock Loop (PLL) and Clock Generator of FPGA 542 of Transceiver 500 (Clock Recovery Circuit)
802 Video Data Buffer
804 Video Data Buffer Level (Buffer Level) Indicator
806 Moving Average Filter
808 Moving Average Filter Output
810 Format Converter
812 Format Converter Error Output
814 LPF Loop Gain (Loop Gain) "G"
816 Second Order Low Pass Filter (LPF)
818 Low Pass Filter (LPF) Error Signal (Filtered Error Signal)
820 Control Logic
822 Phase-Locked Loop (PLL) Circuit
824 PLL Output Clock
826 Clock Divider
828 Jitter Cleaner
830 Programmable Clock Generator
832 I2C Configuration Signal
834 Divided Clock Output
836 Control Logic Output
838 Reference Clock
902 Input Scaling Block
904 Free Running Output Timing Generator
906 Frame Rate Processing Block
908 Output Scaling Block
910 Memory/Frame Buffer (Memory)
1100 Network for Transmitting Multiple Streams of Formatted Audio Data Such That Each Stream of Formatted Data is Matched to an Intended Audio Sink
1200 Network for Transmitting a Single Stream of Formatted Audio Data Such That the Stream Can Be Converted to an Audio Data Format That is Matched to an Intended Audio Sink by a Receiver Associated with the Sink
1300 Network for Transmitting Multiple Streams of Formatted Audio Data Such That Each Stream of Formatted Data Can Be Matched to an Intended Audio Sink and One or More of the Transmitted Streams Can Be Converted to an Audio Format That is Matched to an Intended Audio Sink by a Receiver Associated with the Sink
1400 Method for Broadcasting Audio Data Using an Internet Protocol and a Digital Signal Processor at a Transmitter Associated with the Audio Source
1402-1408 Steps of Method 1400
1500 Method for Broadcasting Audio Data Using an Internet Protocol and one or more Digital Signal Processor(s) Located at one or more Receiver(s) Associated with the Audio Sink
1502-1506 Steps of Method 1500
1600 Method for Broadcasting Audio Data Using an Internet Protocol and one or more Digital Signal Processor(s) Located at both one or more Transmitter(s) Associated with an Audio Source and Receiver(s) Associated with one or more Audio Sinks
1602-1610 Steps of Method 1600

List Of Acronyms Used in the Specification in Alphabetical Order

The following is a list of the acronyms used in the specification in alphabetical order.
4×I²S Inter-Integrated Circuit Source
AAC Advanced Audio Compression
AES Advanced Encryption Standard
AFC Audio Format Capability
ARC Audio Return Channel
ATSC Advanced Television Systems Committee
AV Audio Visual
AVC Audio Video Coding
AV NW Audiovisual Distribution Network
AXI Advanced Extensible Interface
Cat-5 Category Type 5 Cable
CD Compact Disc
CEC Consumer Electronics Control
CPU Central Processing Unit
CTR Counter
DCP Digital Content Protection, L.L.C.
DDC Display Data Channel
DDR3 Double Data Rate Type 3
DP DisplayPort
DSP Digital Signal Processing/Processor
DTV Digital Television
DVD Digital Video Disk
DVI Digital Video Interface
DVR Digital Video Recorder
DVB-C Digital Video Broadcasting-Cable
DVB-S Digital Video Broadcasting-Satellite
DVB-S2 Digital Video Broadcasting-Satellite, Second Generation
DVB-T Digital Video Broadcasting-Television
DVB-T2 Digital Video Broadcasting-Television, Second Generation
DP Display Port
E-DDC Enhanced Display Data Channel
EDID Extended Display Identification Data
FDDI Fiber Distributed Data Interface
FEC Forward Error Correcting
FIFO First-In-First-Out
FPGA Field Programmable Gate Array
FTP File Transfer Protocol
GAN Global Area Network
GB Giga Byte
GBit Giga Bit
HDCP High-bandwidth Digital Content Protection
HDMI High Definition Multimedia Interface
HEC HDMI Ethernet Channel
HTTP Hyper-Text Transfer protocol
IEEE Institute of Electrical and Electronics Engineers
IGMP Internet Group Management Protocol
IIC/I²C/I2C Inter-Integrated Circuit
IP Internet Protocol
IPv6 Internet Protocol Version 6
IR Infra-Red
ISDB-T Integrated Services Digital Broadcasting-Terrestrial
ITU-T International Telecommunication Union Telecommunication Standardization Sector
JPEG2000 Joint Photographer Engineer's Group Image Compression Method
LAN Local Area Network
LPF Low Pass Filter
MAC Media Access Controller
MII Media Independent Interface
MS Millisecond
MLD Multicast Listener Discovery
MPEG-2 Moving Picture Engineers' Group Standard Version 2
MPEG-4 Moving Picture Engineers' Group Standard Version 4PHY Physical
PLL Phase Lock Loop
PWM Pulse Width Modulation
RAM Random access memory
RGB Red Green Blue
RTP Real-time Transport Protocol SDRAM Synchronous Dynamic Random Access Memory
SERDES Serializer/De-serializer
SFP+Small Form-Factor Pluggable Transceiver
SMPTE Society of Motion Picture and Television Engineers
SoC System on Chip
S/PDIF Sony/Philips Digital Interface Format
SRTP Secure Real-time Transfer Protocol
SSL Secure Sockets Layer
TCP Transmission Control Protocol
TLS Transport Layer Security
TMDS Transition Minimized Differential Signal
TMS Transmission Stream
TS Transport Stream
TTL Transistor-Transistor Logic
UDP User Datagram Protocol
USB Universal Serial Bus
VCR Video Cassette Recorder
VCEG Video Coding Experts' Group
VCXO Voltage Controlled Crystal Oscillator
VESA Video Electronics Standards Association
VGA Video Graphics Array
VSync Video Synchronization
WAN Wide Area Network
Mode(s) for Carrying Out The Invention Aspects of the embodiments are directed to an audiovisual (AV) distribution network (AV NW) communicating via internet protocol and implemented as a framework of local area networks (LANs). Transmitters and receivers in the AV distribution network leverage multicast transmission technology and compression standards to switch seamlessly between sources transmitting audiovisual data that may be content protected by a security protocol scheme.

While the various aspects of the embodiments are described as being deployed in a framework of LANs, the embodiments are not necessarily limited thereto. Similarly, while the AV NW is described as employing a variety of formats, protocols and standards, the formats, protocols, and standards, it should be understood by those of skill in the art that such descriptions are for illustrative purposes only, and are not to be taken in a limiting manner. For example, while the high-bandwidth digital content protection (HDCP) 1.x and 2.x and the h.264 compression standards are described in the specification, the AV distribution network is not limited to a particular security protocol or a particular compression standard. Those of skill in the art will appreciate that one or more elements of the described embodiments can be interchanged and/or combined with and among each other.

FIG. 1 illustrates an audiovisual distribution network (AV NW) 100 comprising one or more audiovisual sources (sources) 102, one or more transmitters 104, one or more network switches (switches) 106, one or more receivers 108, and one or more audiovisual sinks (sinks) 110 according to an embodiment.

For over 40 years Creston Electronics Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as networks 1100, 1200, and 1300, among others, can be manufactured by Crestron Electronics Inc., located in Rockleigh, N.J.

AV NW 100 distributes AV data from one or more sources 102 to one or more sinks 110 via one or more switches 106 and networked intermediate transceiver devices functioning as transmitters 104, receivers 108, or both. Each source 102 can transmit AV data to an intermediate transceiver device functioning as a transmitter 104. Transmitter 104 relays the AV data to one or more intermediate transceiver devices functioning as receiver 108. Each of the one or more receivers 108 then transmits the AV data to AV sink 110.

According to aspects of the embodiments, AV sources 102 can be Blu-Ray Disc Players, media servers, digital video disc (DVD) players, digital video recorders (DVR), and cable boxes or any device other device capable of transmitting audiovisual data. AV sources 102 are adapted for transmitting audiovisual data to an intermediate transceiver device, or transmitter 104, over an audiovisual interface. The audiovisual data can be transmitted as an industry standard signal. For example, the audiovisual data can be transmitted via a high-definitional multimedia interface (HDMI), as shown in FIG. 2. The HDMI specification defines an interface for carrying digital audiovisual data. Throughout this discussion, AV source 102 will be described as transmitting digital audiovisual data over an HDMI interface. However, as those of skill in the art can appreciate, the audiovisual interface can be any other interface for transmitting video such as a video graphics array (VGA) interface, a digital video interface (DVI) interface, or a DisplayPort (DP) interface, among others.

In addition, the audiovisual interface can serve as a protected interface, thereby allowing the video source to transmit audiovisual data protected under a security protocol to an intermediate transceiver device (discussed in greater detail below in regard to FIGS. 5-9), or transmitter 104. Various content protection schemes have been developed for a variety of reasons. For example, certain content protection schemes are employed to ensure that a user may not intercept transmissions of television shows, movies and music.

One content protection scheme to protect digital content that is transmitted over cables between devices is known as high-bandwidth digital content protection (HDCP). HDCP is a specified method administered by Digital Content Protection, L.L.C. (DCP), for protecting digital content as it travels across connection interfaces and protocols such as DP, DVI and HDMI. Other security protocols for content encryption include secure real-time transfer protocol (SRTP), secure sockets layer (SSL), and transport layer security (TLS), among others.

A commonly implemented form of a content protection scheme is HDCP 1.x (e.g., ver. 1.4). Traditionally, HDCP 1.x is used to communicate content from point-to-point. In other words, transmitter 102 can only send content to first AV sink 110a using HDCP 1.x, but cannot send it to second AV sink 110b. The use of intermediate transceiver devices, known as repeaters, is permitted; however, it requires further decrypting and re-encrypting as well as additional security steps. Revisions of the HDCP scheme (HDCP 2.x) implement an interface independent scheme thereby allowing a device to transmit protected content to multiple sinks 110.

According to aspects of the embodiments, AV NW 100 as shown in FIG. 1 is an HDCP protected network and accordingly, one or more AV sinks 110 can receive HDCP protected content from one or more of AV sources 102. Additionally, transmitter 104 can distribute HDCP content to more than one receiver 108 simultaneously as provided in HDCP 2.x. The interfaces between each HDCP source 102 and sink 110 can be HDCP protected interfaces. As such, transmitters 104, receivers 108, and intermediate transceiver devices can decrypt the HDCP content at the HDCP receiver on each of its inputs, and re-encrypt the data with an HDCP transmitter on each of its outputs. The intermediate transceiver device informs the upstream device of its downstream connections and it is the responsibility of the intermediate transceiver device to maintain the HDCP protection of those connections.

FIG. 2 illustrates physical connectivity block diagram 200 of audiovisual distribution network 100 shown in FIG. 1 according to an embodiment. AV sources 102 are communicatively coupled to transmitters 104 over a security protocol protected link, such as an HDCP 1.x protected HDMI interface (HDMI/HDCP interface) 202. Transmitters 104 are communicatively coupled to receivers 108 through switches 106, over a security protocol protected link, such as an HDCP 2.x protected interface comprising a plurality of copper or fiber LAN interfaces. The transmitter 104-to-switch 106 interface and switch 106-to-receiver 108 interface are characterized in FIG. 2 as local area network (LAN) interface 204, and can use Category-5 (Cat-5) copper cabling or fiber optic cabling. Receivers 108 are communicatively coupled to AV sinks 110 over a security protocol protected link such as HDMI/HDCP interface 202.

In the Figures that follow, other interfaces are shown aside from the ones in FIG. 2; some interfaces are used between modules, some between components of circuit boards, and some within devices, such as within a field programmable gate array (FPGA). As those of skill in the art can appreciate, the interfaces can define a physical construct of the interconnections between apparatus, which can include different signal paths, signal levels, and so on. By way of example, HDMI has three physically separate communication channels, which are described below. Other versions of HDMI have added channels, such as audio return channel (ARC) and HDMI Ethernet channel (HEC), but such detailed discussion is both beyond the scope of the this discussion, and not necessary to understand the aspects of the embodiments.

The first HDMI channel is the display data channel (DDC; or enhanced DDC (E-DDC), which is a communication channel based on the I²C bus specification ("inter-integrated circuit" (also referred to as "IIC," or "I2C"), is a multi-master, multi-slave, single-ended, serial computer bus used for attaching low-speed peripherals to computer motherboards and embedded systems). According to the HDMI specification, an I²C standard mode speed of 100 Kbit/s must at least be maintained, and further provides for a fast mode speed of operation of 400 Kbit/s. The DDC channel is actively used for HDCP.

The second HDMI channel is the TMDS channel, which actually refers to a method of transmitting data known as transition minimized differential signaling (TMDS), which is described in greater detail below. The TMDS channel interleaves video, audio, and auxiliary data using three different packet types, called the video data period, the data island period, and the control period. During the video data period, the pixels of an active video line are transmitted. During the data island period, which occurs during the horizontal and vertical blanking intervals, audio and auxiliary data are transmitted within a series of packets. The control period occurs between video and data island periods. The final channel is referred to as the consumer electronics control (CEC) channel, and is an HDMI feature designed to allow the user to command and control up-to 15 CEC-enabled devices that can be connected through HDMI by using only one of their remote controls. CEC also allows for individual CEC-enabled devices to command and control each other without user intervention.

Thus, as those of skill in the art can appreciate, each interface type has its own particular specifications, and while certain types of data are more readily transmitted by some interfaces than others, according to further aspects of the embodiments, the interface in and of itself should not be construed as determining what type of data is being transmitted within it (i.e., video, audio, command, status, and other types of signals).

The encryption algorithm HDCP 2.x comprises at least two functions: authentication of receiving devices, and encryption of audiovisual data. Before a device can receive a session key necessary to decrypt audiovisual data encrypted by the HDCP transmitter, it undergoes a multistep process. Included in the process are at least four steps: (1) authentication and key exchange; (2) locality check; (3) authentication with repeaters; and (4) session key exchange. Each will be described in turn.

The "authentication and key exchange" step involves the verification of the HDCP receiver's public key certificate. During this step, a master key, $k_m$, is transmitted from receiver 108 to transmitter 104.

The "locality check" step allows transmitter 104 to verify that receiver 108 is located in the vicinity of transmitter 104. To verify that receiver 108 is in the same vicinity as transmitter 104, transmitter 104 performs a round trip time test that checks to see that the delay between a pair of messages is not more than about 7 milliseconds (MS).

The "authentication with repeater" step is employed if receiver 108 is a repeater. This step involves the communication of the downstream topology from repeaters 108 in the path to transmitter 104.

The "session key exchange" step is performed after the authentication checks (steps (1) and (3)) and locality check (step (2)) are complete. The session key, $k_s$, originates from and is sent by transmitter 104 to receiver 108, in order to encrypt and decrypt the audiovisual data. Unlike HDCP 1.x, which is a point-to-point link, HDCP 2.x allows for multiple receivers 108 to decode the same content using the same encryption key.

To transmit the same content to multiple receivers 108 on an IP network, there are three forms of IP communication: unicast, multicast, and broadcast. Unicast communications provide a route for sending datagrams from one end-point to another end-point. Multicast communications provide routes for datagrams to be sent from at least one end-point to a pre-designated group of end-points. In broadcast communications, an end-point sends the same datagrams to all connected end-points. Each of the three forms of IP communications will be described in turn.

Common unicast communications can use any one of hypertext transfer protocol (HTTP), file transfer protocol (FTP), user datagram protocol (UDP), and transmission control protocol (TCP). While a detailed discussion of the nature of each of these communication protocols is both unnecessary and beyond the scope of this discussion, and therefore, in fulfillment of the dual purposes of clarity and brevity, has been omitted herein, a short discussion of each will aid in understanding the various aspects of the embodiments.

Unicast is the most common of the three IP communications. Transmitter 104 can transmit multiple copies of audiovisual data by a unicast message that uses TCP, UDP, HTTP, or FTP. However, as the number of receivers 108 increase, the amount of data transmitter 104 needs to transmit increases as well. Thus, at some point it becomes more efficient to use a multicast or broadcast type of communication.

In addition to unicast, transmitter 104 can transmit multiple copies of the audiovisual data via a broadcast stream. Broadcasts force all devices on the network segment to receive the traffic. While this ensures that each device on a network receives a communication, this manner of communication also wastes bandwidth. Broadcasting to devices that are not involved with the broadcasted content burdens those devices and results in wasted network bandwidth.

Multicast is a form of communication that optimizes the use of bandwidth. Multicast achieves this optimal use of transmission bandwidth by sending the audiovisual data (in this case) only to a subset of devices using a special set of addresses. Multicast uses internet group management protocol (IGMP) as the communications protocol. IGMP assists in managing the group of receivers that will receive the multicast transmission. One way to minimize inefficient use of transmission bandwidth when communicating using multicast is by having network switches 106 implement IGMP snooping to reduce network traffic on segments with no devices in the group. Accordingly, transmitters 104 can transmit HDCP 2.x encrypted content to multiple receivers 108 via an IP multicast stream. This reduces both the bandwidth on the network as well as the processing burden on devices. As those of skill in the art can appreciate, snooping is the process of listening to IGMP network traffic, such that network switches 106 can maintain a map of which links need which IP multicast streams. Consequently, multicasts transmissions can be filtered from links that do not need them, and thus network switch 106 controls which ports receive which specific multicast traffic.

FIG. 3 illustrates transmitter block diagram 300 that comprises, in part, transmitter 104 for use with AV NW 100 of FIG. 1 according to an embodiment. FIG. 4 illustrates receiver block diagram 400 that comprises, in part, receiver 108 for use with AV NW 100, and FIG. 5 illustrates a functional block diagram of transceiver 500 that can be used as both transmitter 104 and receiver 108 as shown in FIGS. 3 and 4, respectively, for use with AV NW 10 of FIG. 1 according to an embodiment. In addition, FIGS. 6-9 illustrate different portions of transceiver 500. Furthermore, it should be understood by those of skill in the art that the block diagrams of FIGS. 3-9 are for illustrative purposes only. As such, components and functions in these block diagrams can overlap. For example, programmable clock generator 830 of FIG. 8 can perform substantially the same function and be embodied in the same device as free running output timing generator 904 of FIG. 9.

Referring back to FIG. 3, transmitter 104 comprises transmitter HDMI transceiver 302, uncompressed packet formatter FPGA (packet formatter FPGA) 304, transmitter Ethernet PHY module (PHY module) 306, transmitter central processing unit (CPU) 308, transmitter memory buffer (memory buffer) 310 and transmitter digital signal processor (transmitter DSP) 312. According to an embodiment, transmitter 104 is further adapted for unencrypting the HDCP protected content and re-encrypting it for transmission over an IP based network. Transmitter 104 can be further adapted for substantially simultaneously transmitting the audiovisual data in both a compressed format and an uncompressed format. According to an embodiment, transmitter 104 compresses the audiovisual content according to the h.264 video compression format, or the Motion Pictures Experts Group (MPEG)-4 Part 10 Advanced Video Coding (AVC) video compression format. Both of these formats are known to those of skill in the art, and in fulfillment of the dual purposes of clarity and brevity do not need to be discussed in any greater detail.

In operation, transmitter 104 receives the encrypted audiovisual content (HDCP 1.x or 2.x) over HDMI/HDCP interface 202. HDMI transceiver 302 then removes the HDCP encryption from the audiovisual data by decrypting the AV data. The signal output from HDMI transceiver 302 is in the form of TMDS. As those of skill in the art can appreciate, TMDS is a technology for transmitting high speed serial data, and can be used by HDMI video interfaces, as well as other types of digital interfaces. TMDS seeks to reduce electromagnetic interference by using advanced coding algorithms. The coding algorithms have the effect of reducing electromagnetic interference and enabling robust clock recovery and high slew tolerance by converting each one of a data word into an equivalent longer data word that, when decoded, contains the same information, but is designed to spread out more evenly the number of high logic signals and low logic signals (e.g., the "ones" and "zeros"). This averages out the power being distributed, and keeps the clock recovery fairly uniform over time. For example, an eight bit word has 256 possible combinations. These can include "1000000" and "00001111," for example. While over an amount of time, the number of low and high logic signals will average out, transmissions such as the ones shown above can cause difficult clock recovery, and very high or very low electromagnetic transmissions, as well as power usage. Thus, TMDS uses up to 460 ten bit words to represent the 256 possible values. Words such as those shown are avoided. The front end processing of the transmitter 104 will be described in great detail below in regard to FIGS. 5 and 6.

After being received and processed by HDMI transceiver 302, the unencrypted audiovisual content is then routed to packet formatter FPGA 304. Packet formatter FPGA 304 conditions or processes the TMDS signal comprising the audiovisual content to a format that can be encrypted using HDCP 2.x. The conditioned audiovisual data is routed to an IP encoder, such as an society of motion picture and television engineers (SMPTE)-2022-5/6 encoder, and on to an Ethernet 10 gigabit (GBit) Media Access Controller (MAC) using multicast UDP messages. The audiovisual data then exits packet formatter FPGA 304 and is routed to PHY module 306, such as a 10 GBit PHY or fiber module. CPU 308 implements the low bandwidth authentication, locality check, and key exchange portion of HDCP. The encapsulation functions of transmitter 104 will be described in greater detail below in regard to FIGS. 5, 6, and 7.

FIG. 11 illustrates network 1100 for converting a single stream of audio data (audio stream $AS_1$) with a first audio format capability ($AFC_1$) into two or more audio streams of data with a plurality of audio format capabilities ($AS_2$ with $AFC_2$, and $AS_3$ with $AFC_3$, by way of non-limiting example) and wherein the plurality of audio streams is transmitted through network 1100 to respective audio sink devices 110 that can use the respective formatted audio data. The transmitted plurality of streams of formatted audio data ($AS_1$, $AS_2$, $AS_3$) are generated from a single stream of formatted audio data ($AS_0$) such that the audio data within respective ones of the plurality of streams is matched to an intended audio sink according to an embodiment. Referring to FIG. 11, transmitter DSP 312 is included with transmitter 104. DSP 312 provides an embodiment in which the problem of mis-matching of audio format capabilities between audio sources and audio sinks is solved. That is, according to further aspects of the embodiment, DSP 312 (of transmitter 104) acts as a source convertor that accepts audio and video content from the source device 102 to which it is connected, using an interface such as HDMI, DisplayPort (DP), or Sony/Philips Digital Interface Format (S/PDIF). As those of skill in the art can appreciate, Display Port is a digital display interface developed by the Video Electronics Standards Association (VESA). The interface is primarily used to connect a video source to a display device such as a computer monitor, though it can also be used to carry audio, USB, and other forms of data. S/PDIF, as those of skill in the art can also appreciate, is a type of digital audio interconnect used in consumer audio equipment to output audio over reasonably short distances. Further, S/PDIF S/PDIF is a data link layer protocol and a set of physical layer specifications for carrying digital audio signals between devices and components over either optical or electrical cable. According to further aspects of the embodiments, the same interfaces can be used between receivers 108 and sinks 110, in all of the networks shown in FIGS. 11, 12, and 13.

Transmitter DSP 312 then converts the audio content portion from the first source content into one or more formats that are compatible with the audio format capability of the one or more sinks 110 connected to one or more receivers 108. As those of skill in the art can appreciate, substantially all sinks 110 and sources 102 will be able to use or transmit audio in the stereo format; some can do at least two audio format capabilities (stereo and something else), some can do three or more, and some may only be able to do stereo.

According to aspects of the embodiments, the conversion that occurs in transmitter DSP 312 (and in receiver DSP 412, as discussed below) is performed using the known programming capabilities of typically available DSPs; that is while one particular DSP can be used in the transmitters (and receivers) as manufactured by Crestron Electronics, Inc., (e.g., such as the Cirrus Logic CS49834A DSP, current specifications of which can be found at http://www.cirrus-.com/en/products/cs49834-44.html?prodKey=CS49834), other DSPs can be used, as long as the programming and conversion speed capabilities can meet the overall processing requirements within network 1100 (and networks 1200, 1300, described below). While such programming techniques and capabilities are known to those of skill in the art, the particular implementation of conversion between one or more audio formats to one or more different audio formats as described herein, within the network environment are believed to be, within the aspects of the embodiments described herein, novel, un-obvious, and possess utility. In addition, while such conversion programming takes place in the embodiment of a DSP, such conversion is not limited thereto. That is, generally known programming techniques available to one or more microprocessors of different types can also accomplish the conversion between audio formats as described here, including having one or more microprocessors dedicated to decoding, and having one or more other microprocessor dedicated to encoding. All such programmable devices and additional devices not mentioned capable of such programming are to be considered to be within the aspects of the embodiments as well. Further still, those of skill in the art can appreciate that any and all such decoding/encoding are subject to the availability of one or more licenses from the developers of such audio format encoding standards.

For example, referring to FIG. 11 and network 1100, first source 102a outputs a first audio stream $AS_0$ in a first format $AFC_0$, and first transmitter 104a receives the audio stream $AS_0$ in the first audio format $AFC_0$. If $AS_0$ is to be sent to three separates sinks (sinks 110a, 110b, and 110c), each having a different audio format (formats $AFC_1$, $AFC_2$, and $AFC_3$, respectively), transmitter DSP 312 will generate three audio streams, $AS_1$, $AS_2$, and $AS_3$, each with respective different audio formats, $AFC_1$, $AFC_2$, and $AFC_3$. Transmitter then transmits the three separate streams of data, $AS_1$, $AS_2$, and $AS_3$ through switch 106a (or whichever switch 106 it might be connected to) and the audio streams will be sent to the correct receivers 108a-c, and ultimately the appropriate sinks 110a-c. According to aspects of the embodiments, one or more of the audio streams output from transmitter 104a in this example can have the same audio format as was received from source 102a; however, that need not necessarily be the case. DSP 312 can generate new audio streams of data with the same or different audio formats than was originally received from source 102a.

According to aspects of the embodiments, transmitter 104a is told, or determines, the audio format capability that each sink 110 can use. According to aspects of the embodiments, in network 1100 (and 1200 and 1300, as described in detail below), each of receivers 108, when connected to sink 110, will interrogate its respective sink 110, and determine its audio format capability. Receivers 108 will then broadcast this information to all of the transmitters in network 1100. Alternatively, according to still further aspects of the embodiments, transmitters 104 can also interrogate all the devices of network 1100, find the receivers 108, and query what type of sinks 110 are attached to them, if any, and in that manner determine the audio format capability of the sinks 110. FIG. 10 illustrates a non-exhaustive list of currently available audio format capabilities. According to further aspects of the embodiments, a user can manually input the audio format capability of each sink in a manner as described in greater detail below.

In FIG. 11, source 102a outputs audio stream $AS_0$, with a first audio format $AFC_0$. Transmitter 104a receives the first audio stream, $AS_0$, and either determines, or is informed, that three different sinks (sinks 110a, 110b, and 110c), are scheduled to receive audio stream $AS_0$, but in their own native audio formats. DSP 312 in transmitter 104a then reformats the audio stream $AS_0$ into three separate audio streams, $AS_{1-3}$, each with the audio formatted in correspondence to the sink 110a-c that it is being sent to. Thus, transmitted from transmitter 104a in FIG. 11 is $AS_1$ with $AFC_1$, $AS_2$ with $AFC_2$, and $AS_3$ with $AFC_3$. Switch 106a receives the three audio streams, and sends them to the appropriate receiver ($AS_1$ to receiver 108a, and sink 110a; $AS_2$ to receiver 108b, and sink 110b; and $AS_3$ to receiver 108c, and sink 110c). Finally, each respective audio sink 110a-c receives its particular audio stream with its uniquely formatted audio information.

As briefly discussed above, while different audio formats will be viewed, or "heard" by users differently, i.e., there is no universally accepted "best" audio format, it is also the case that converting from one format to another can be accomplished, but with some degradation in sound quality. For example, a conversion from a 7.1 audio format to stereo can be accomplished; the result will be acceptably adequate stereo sound, but with a loss of the 7.1 audio immersive experience. A conversion from stereo to 7.1 can also be accomplished, but with a less than full audio experience than would be the case in which original 7.1 audio format was output through a 7.1 audio format system. Such technology, conversion from stereo to the "upper" audio formats (stereo to 5.1, 7.1, among others) is currently available; These products are known as "ProLogic" and "Neo." As those of skill in the art can appreciate, conversion from 7.1 to stereo back to 7.1 can be a lossy process. However, encoding the channels separately usually results in less loss. Such is the case with other audio formats. Depending on the level of complexity, some audio formats require more or less data, and an according amount of network bandwidth. Further, it is known that some formats can be converted readily and effectively to others, while some cannot be converted. Still further, there is the question of licensing. At least several of the audio formats illustrated in alphabetical order in FIG. 10 are proprietary and/or subject to patent(s), and thus could require the payment of licensing fees prior to use.

As those of skill in the art can appreciate, the plurality of sinks 110 do not have to have different audio formats; they can all be the same, or all different, or any combination thereof. Further, as those of skill in the art can appreciate, there are certain tradeoffs in configuring a digital audio re-formatting system and method according to aspects of the embodiments in the manner shown and described herein in regard to FIG. 11. That is, while preserving the highest capability audio signal possible for the respective sources 102 and sinks 110, this comes at the price of transmission bandwidth. Where before only one audio stream was sent, there can be up to N audio signals, where N is the number of different audio formats. Furthermore, whereas before only one high-capability audio format transmission might have been sent through network 1100, now there could be two, three or more relatively high capability audio transmission streams, and this will require additional data and bandwidth requirements. Thus, increased audio fidelity comes at the cost of increased use of network resources (i.e., bandwidth).

Referring again to FIG. 11, and network 1100, a first example according to an aspect of the embodiment will be described. For example, within a home network environment there could be a Blue Ray player as source 102a, and it is desired to watch this content in multiple rooms. The house has Ethernet network 1100 running to these rooms, or Wi-Fi is installed (which can also be considered to be network 1100). The NV content is output from source 102a as HDMI, and then converted, at transmitter 104a, to a network compatible stream using various techniques depending on network capacity, network physical layer and the amount of latency that can be tolerated. In some cases, there can be a 10 Gbit infrastructure that can handle uncompressed audio/video data rates. In other instances, the audio/video needs to be compressed to fit into the 10/100/1000 mbit type wired network or some type of 802.11 wireless network. The audio formats can consist of compressed or uncompressed audio, various channel number configurations and different audio sample rates. Regardless of the compression, channel number configuration, and other characteristics, the audio/video content (or only audio content) is converted into a network appropriate protocol, and transmitted. According to further aspects of the embodiments, such a protocol can be an IP.

As known to those of skill in the art, common consumer AN transmission links such as HDMI transmitter 104 have the capability to interrogate one or more sink devices 110a-c, using extended display identification data (EDID) to determine their respective audio capabilities. That is, transmitter 104 can determine respective audio format capabilities of each of audio sinks 110a-c using EDID. Transmitter 104 obtains the audio format capability-per-audio sink information, and uses it to create multiple audio streams ($AS_{1-N}$) with respective audio formats, $AFC_{1-N}$ according to aspects of the embodiments. According to further aspects of the embodiments, transmitter 104 can determine (or obtain from receivers 108) the respective audio format capabilities of each of the audio sinks 110a-n. As known to those of skill in the art, the HDMI standard defines some mandatory formats that all devices must support so that all combinations of sources and sinks results in compatible audio communication.

Referring back to FIG. 11 and network 1100 in this example, source 102a can be directed to distribute audio to three audio sinks 110a-c. Transmitter 104 uses EDID information from each of receivers 108a-c connected to respective audio sinks 110a-c to determine that audio sink 110a accepts Dolby Atmos, which is the native format output by source 102a, audio sink 110b accepts Dolby Digital 7.1 Plus, which is a lossy form of audio format, and audio sink 110c accepts Dolby Pro Logic. Source 102a outputs the audio content in Dolby Atmos (in an audio stream), and transmitter 104a receives it and then generates three separate streams using DSP 312: $AS_1$ with $AFC_1$ of Dolby Atmos to send to audio sink 110a (in this case, no processing was done, as this is a "pass-through and forward" case; thus, $AS_1$ is substantially the same as $AS_0$, and $AFC_1$ is substantially the same as $AFC_0$); $AS_2$ with $AFC_2$ of Dolby Digital 7.1 to send to audio sink 110b; and $AS_3$ with $AFC_3$ of Dolby Pro Logic to send to audio sink 110c. Switch 106a receives the three separate streams, and directs them to the appropriate receivers: $AS_1$ to receiver 108a; $AS_2$ to receiver 108b; and $AS_3$ to receiver 108c. Each of the three receivers 108a-c then forwards the properly formatted audio content to their respective audio sinks 110a ($AS_1$), 110b ($AS_2$), and 110c ($AS_3$). According to further aspects of the embodiments, one, some, or all of the transmission between sources 102 and transmitters 104, transmitters 104 and switches 106, switches 106 and receivers 108, and receivers 108 and sinks 110, can be encrypted use an advanced encryption standard (AES). The same applies to each of the networks of FIGS. 12 and 13.

FIG. 12 illustrates network 1200 for transmitting a single stream of formatted audio data such that the stream can be converted to an audio data format that is matched to an intended audio sink 110 by a corresponding, respective receiver 108 associated with the sink 110 according to an embodiment. Network 1200, as shown in FIG. 12, is substantially similar to that of network 1100 of FIG. 11, but instead of having the DSP at the head of the streaming audio data, receiver DSP 412 is located at each respective receiver 108 so that, in effect, only one stream of audio data is sent through network 1200, and only one conversion occurs to the appropriate audio format for the respective audio sink 110 connected to the respective receiver 108. The benefit of network 1200 in regard to transmitting the audio format signal compatible with the audio sink is that only one stream of audio data is used in network 1200 versus the N streams in network 1100, as discussed above. However, there is an associated cost because an additional receiver DSP 412 has to be included with each receiver 108. Licensing fees need to be accounted for, and there can be simple, straightforward licensing of technology, or the licensing fees can be fairly complicated (e.g., cross licensing between different providers, or between different products from a single technology provider) As those of skill in the art can appreciate, the audio signal can be part of a combined audio-video signal, as well as a stand-alone audio signal.

An example of a distribution of audio content from source 102a to sinks 110a-c using network 1200 will now be discussed, using essentially the same distribution of audio formats as was described in the example in regard to network system 1100 and FIG. 11. That is, source 102a outputs an original audio stream $AS_0$ with an audio format $AFC^\circ$, and in this case, transmitter 104a passes that through to switch 106a, along with appropriate addressing information (i.e., to which sink(s) $AS_0$ with AFC° should be sent). Switch 106a receives $AS_0$ with AFC° and forwards it to receivers 108a-c (using an IP mode of transmission). Receiver DSP 412a in receiver 108a, knowing that its corresponding sink 110a accepts audio with an audio format capability of $AFC_1$, generates $AS_1$ with a format of $AFC_1$ from $AS_0$ with an audio format AFC°, and transfers it to sink 110a, according to aspects of the embodiments. A substantially similar process occurs with each of receivers 108b and 108c, albeit with different audio formats for their respective sinks 110b, 110c, as shown in FIG. 12, according to aspects of the embodiments.

According to further aspects of the embodiments, a hybrid of networks 1100 and 1200 can also be implemented, as shown in FIG. 13. FIG. 13 illustrates network 1300 for transmitting one or more streams of formatted audio data such that one or more of the transmitted streams can be converted to an audio data format that is compatible to an intended audio sink 110 according to an embodiment. FIG. 13 illustrates network 1300 that combines aspects of both networks 1100 and 1200; that is, both transmitters 104 and receivers 108 contain respective DSP's such that more discriminatory re-formatting can take place.

According to further aspects of the embodiments, the processing that occurs in either or both of transmitter DSP 312 and receiver DSP 412 can be split between the two in the embodiment shown in FIG. 13. For example, source 102a can output original audio stream $AS_0$ with an original audio format AFC°. Transmitter 104a with DSP 312 can receive audio stream $AS_0$ with audio formatted according to AFC°, and generate two streams: $AS_1$ with $AFC_1$, and $AS_2$ with $AFC_2$. Transmitter 104a transmits $AS_1$ and $AS_2$ to switch 106a, which forwards the received audio streams according to EDID information received from transmitter 104a. For example, $AS_1$ with $AFC_1$ can be forwarded to receiver 108a, and $AS_2$ with $AFC_2$ can be forwarded to receivers 108b and 108c. Receiver 108a knows that sink 110a, with which it communicates, accepts audio formatted according to $AFC_1$, so no re-formatting need occur. That is, $AS_1$ with $AFC_1$ is received by receiver 108a, and then forwarded to sink 110a. $AS_2$ with $AFC_2$ is also forwarded by switch 106 and sent to receiver 108b; in this case, sink 110b, which corresponds to receiver 108b, accepts audio formatted according to $AFC_2$. Therefore, no additional re-formatting is necessary by receiver DSP 412 of receiver 108b. But, in the case of receiver 108c and its corresponding sink, sink 110c, the audio needs to be formatted with $AFC_3$. Thus, receiver DSP 412c of receiver 108c re-formats the received audio, AS2 with $AFC_2$, and generates $AS_3$ with $AFC_3$, which is then sent to sink 110c according to aspects of the embodiments. As those of skill in the art can now appreciate, the audio stream received by receiver 108c could also have been $AS_1$ with $AFC_1$, and then a re-formatting between $AFC_1$ and $AFC_3$ would have had to occur. There can be practical considerations as to which formats can be generated based on licensing issues, as briefly described above, and there can be practical considerations as well. For example, attempting to generated a Dolby Digital 7.1 TrueHD audio signal from a stereo signal might generate outputs from all eight speaker groups, but would not be true 7.1 as there are only two channels to begin with. Thus, formatting can occur in either or both of DSP 312 at transmitter 104, or in receiver DSP 412 at receiver 108. At least one advantage of this configuration and method is that the demand on the bandwidth of network 1300 is reduced than if TMS1 with AFC1 were to be transmitted directly through the network.

Furthermore, in the event that there is an accompanying video signal within TMS1, audio-video synchronization can be more readily maintained. According to the aspects of the embodiments, the latter advantage can be realized in network 1200 as well. According to further aspects of the embodiments, other audio processing related advantages can be realized, such as echo cancellation, among other improvements. As known to those of skill in the art, most humans can tolerate up to about 20 milliseconds (ms) mismatch between video and accompanying video signals. Thus, substantially near real time audio processing can be important. Such audio-video processing can occur through the use of digital signal processors such as those used for transmitter DSP 312 and receiver DSP 412. That is, transmitter DSP 312 and receiver DSP 412 can perform complex processing of the audio signal at or less than 20 ms in regard to the accompanying video signal. One so called "acid-test" of audio-video processing and mis-match testing includes viewing and listening to a video of a person speaking into a microphone. Not only is there the actual physical video and audio signals to compare, but because of the nature of the video—seeing a person speaking into a microphone—the effect is emphasized if there is any mismatch.

Aspects of the embodiments involve a networked based distribution system that can implement a 1-to-many or N×M cross point switching matrix. As those of skill in the art can appreciate, a video to network convertor box can be configured as either a transmitter or receiver; such a configuration is shown in FIG. 7. Further, it is known that transmitters 104 can separate the elements of an HDMI signal into the video and audio data. The video data can be compressed using h.264, JPEG2000 (Joint Photographer Engineer's Group image compression method 2000), or the video data can be uncompressed and prepared for network transmission by packetizing. According to further aspects of the embodiments, the audio data is also packetized. FIG. 3 illustrates the block diagram of the device configured as an uncompressed transmitter. According to further aspects of the embodiments, DSP 312, as shown in FIG. 3, can receive the extracted audio content over a plurality of I2S interfaces (e.g., four), if high bit rate audio content such as Digital Theater Systems high definition (DTS-HD) or Dolby TrueHD is being distributed. A single I2S interface is adequate to communicate a stereo down mix back to the packet encapsulater.

FIG. 14 illustrates a flow chart of method 1400 for distributing one or more audio files in an audio stream using an internet protocol in network 1100 based on an audio format capability to one or more audio sinks 110 according to an embodiment. Method 1400 begins with method step 1402, wherein source 202 is directed to transmit an audio file using a first transmission protocol, such as HDMI. The audio file distributed or transmitted according to the first transmission protocol can be part of an audiovisual presentation, and can be transmitted to one or more audio sinks 110. The audio file is output as an audio stream according to a first audio format capability. In method step 1404, transmitter 104 ascertains the audio format capability of each audio sink 110. According to further aspects of the embodiments, transmitter 104 could already have the knowledge of the audio format capabilities of the sinks 110 of network 1100, either by querying receivers 108, or by receivers 108 broadcasting that information, or by users manually inputting "EDID" type information able the sinks' 110 audio format capability by hand. According to further aspects of the embodiments, such EDID information can originate from other sources through network 1100, 1200, or 1300, i.e., from a remote interface such as a computer, or other device that can communicate through or to the respective network. In method step 1406, transmitter 104 receives the output audio file in its native format (i.e., in the format transmitted by source 102) and generates one or more audio streams with one or different audio formats. While there could be up to N different sinks 110 to receive the audio stream from source 102, of the N different sinks, there could only be M different audio formats: therefore, M can be less than or equal to N (i.e., some sinks could have the same audio format capability). Each audio stream can be transmitted by transmitter 104 using an internet protocol (IP), although other protocols can also be used. The audio streams are then sent to their intended audio sink 110 through their respective receiver 108 with the audio stream contained therein at the audio format capability that the intended audio sink 110 can support. This ensures the highest or greatest audio fidelity signal is received and reproduced at the respective audio sink 110.

FIG. 15 illustrates a flow chart of method 1500 for distributing one or more audio files using an internet protocol in network 1200 based on an audio format capability to one or more audio sinks 110 according to an embodiment. Method 1500 begins with method step 1502, wherein source 202 is directed to output an audio file (which can be part of an audiovisual presentation) to one or more audio sinks 110 in an audio stream, and begins the transmission using a first transmission protocol, such as HDMI. In method step 1504 transmitter 104 receives the transmitted audio file in the transmission stream, at the audio format capability native to that of source 102, and forwards it to each of the receivers 108 that correspond to the intended audio sinks 110 through switch 106. According to aspects of the embodiments, transmitter 104 transmits the audio stream using an IP, although other protocols can also be used.

In method step 1506, each receiver 108 receives the same transmission stream, and converts the audio stream from the format as transmitted from source 102 to the audio format capability that corresponds to the capability of the audio sink 110 it is being transmitted to (unless, of course, the respective audio sink 110 can accept that same audio format capability that the audio stream was originally transmitted in; then no conversion need occur). The appropriately formatted audio file is then sent to the corresponding audio sink 110. This ensures the highest audio fidelity signal is received at the respective audio sink 110.

FIG. 16 illustrates a flow chart of method 1600 for distributing two or more audio streams using an internet protocol in network 1300 of FIG. 13 based on an audio format capability to two or more audio sinks 110 according to an embodiment. Method 1600, as FIG. 13 and network 1300 illustrates, combines both aspects of the methods 1400 and 1500, as network 1600 illustrates (DSP 312 in transmitter 104 and receiver DSP 412 in one or more of receivers 108). Method 1600 begins with step 1602 wherein source 202 is directed to transmit an audio file (which can be part of an audiovisual presentation) to two or more audio sinks 110, and begins transmission using a first transmission protocol, such as HDMI. In method step 1604, transmitter 104 ascertains the highest quality audio format capability of each audio sink 110. According to further aspects of the embodiments, transmitter 104 could already have the knowledge of the audio format capabilities of the sinks 110 of network 1100, either by querying receivers 108, or by receivers 108 broadcasting that information, or by users manually inputting "EDID" type information able the sinks' 110 audio format capability by hand. According to further aspects of the embodiments, such EDID information can originate from other sources through network 1100, 1200, or 1300, i.e., from a remote interface such as a computer, or other device that can communicate through or to the respective network.

In method step 1606, transmitter 104 receives the transmitted audio file in its native format (i.e., in the format transmitted by source 102) and generates two or more transmission streams with at least two different audio formats. For example, if transmitter 104 receives $AS_0$ with $AFC°$, and is directed to transmit two audio streams, it could generate and transmit $AS_0$ with $AFC_0$ and $AS_1$ with $AFC_1$, or $AS_1$ with $AFC_1$ and $AS_2$ and $AFC_2$. Each transmission stream is transmitted to its intended audio sink 110 through their respective receiver 108 with the audio file contained therein at the audio format capability that corresponds to the capability of the audio sink 110 it is being transmitted to. Transmitter 104 transmits the audio streams using an IP, although other protocols can also be used. This ensures the highest audio fidelity signal is received at the respective audio sink 110. In method step 1608, transmitter 104 transmits the two or more audio streams through switch 106 to two or more receivers 108 that correspond to intended recipients, audio sinks 110. In method step 1610, receivers 108 receive their respective audio streams and generate or forward the audio stream with the audio format capability that is compatible with its corresponding sink 110. According to aspects of the embodiments, at least one of the audio format capabilities of sink 110 will be generated by receiver DSP 412 of receiver 108, and at least one of the audio format capabilities of the audio stream forwarded to a sink 110 will either have been generated by transmitter 104, or be the same as output by source 102 according to aspects of the embodiments.

Attention is now directed to network switch 106, shown in FIG. 1. In addition to distributing the audiovisual content from transmitters 104 to receivers 108, network switch 106 is further adapted to communicate information (e.g., such as command and status information, among other types) between transmitters 104 and receivers 108. For example, network switch 106 can facilitate the communication of information necessary for HDCP authentication between devices, transmit control and status information, and extended display identification data (EDID) information from sink 110 to source 102, as well as other information. As those of skill in the art can appreciate, EDID information is a data structure provided by a digital display (e.g., sink 110) to describe its capabilities to a video source (e.g., source 102). EDID is defined by a standard published by VESA. The EDID includes manufacturer name and serial number, product type, phosphor or filter type, timings supported by the display, display size, and luminance data, among other types of display-related data.

To facilitate multicast communication on the network, network switch 106 implements a multicast group management protocol. According to an embodiment, network switch 106 implements internet group management protocol (IGMP) snooping. IGMP is a communications protocol used by hosts and adjacent routers on IP networks to establish multicast group membership.

According to further aspects of the embodiments, network switch 106 implements multicast listener discovery (MLD) to manage multicast groups. As those of skill in the art can appreciate, MLD is a component of the IP version 6 (IPv6) suite. MLD is used by IPv6 routers for discovering multicast listeners on a directly attached link, much like IGMP is used in IPv4. While AV NW 100 is described throughout this specification as implementing IGMP, those of skill in the art can appreciate that this is for illustrative purposes only, and the multicast group management protocol is not limited thereto. In addition, and according to further aspects of the embodiments, AV NW 100 is not limited to use of a single AV NW switch 106, but can, as shown in FIG. 1, include a plurality of NW switches 106a-n.

FIG. 4 illustrates receiver block diagram 400 that comprises, in part, receiver 108 for use with AV NW 100 of FIG. 1 according to an embodiment. Receiver 108 device comprises receiver Ethernet PHY module (Ethernet PHY) 402, packet decoder FPGA 404, receiver HDMI transceiver (HDMI transceiver) 406, receiver CPU (CPU) 408, and receiver memory buffer 410.

According to further aspects of the embodiments, receiver 108 reverses the process of transmitter 104 with the added function of recovering the pixel clock signal. Receiver 108 is adapted to receive both compressed and uncompressed audiovisual data from transmitter 104 over an IP based network link. For example, receiver 108 can receive a multicast UDP message via an Ethernet PHY interface. As described above, receiver 108 can receive HDCP protected content from transmitter 106 via an HDCP protected interface, such as LAN interface 204. Receiver 108 is further adapted to unencrypt HDCP protected content and re-encrypt the same for transmission over an AV interface such as HMDI/HDCP interface 202.

Receiver 108 is adapted to receive the encrypted audiovisual content (HDCP 2.x) over the HDCP protected network link as a UDP multicast (HDMI/HDCP interface 202). Referring back to FIG. 3, it can be seen that transmitter 104 employs HDMI transceiver 302 to remove the HDCP encryption, processes it as an unencrypted TMDS signal, re-encrypts the audiovisual content, and then transmits it via PHY module 306 on LAN interface 204. Once received at receiver 108, the encrypted audiovisual content is unencrypted (in packet decoder FPGA 404) to form an unencrypted TMDS signal. While encryption of the TMDS signal does not occur in packet decoder FPGA 404 according to aspects of the embodiments, those of skill in the art should appreciate that encryption of the TMDS signal could occur in packet decoder FPGA 404. The signal comprising the audiovisual content then exits packet decoder FPGA 404 and is routed to HDMI transceiver 406. CPU 408 implements the low bandwidth authentication, locality check, and key exchange portion of the HDCP encryption process.

FIG. 5 illustrates a functional block diagram of transceiver 500 that can be used as both transmitter 300 as shown in FIG. 3 and receiver 400 as shown in FIG. 4, for use with AV NW 100 of FIG. 1 according to an embodiment. In FIG. 5, transceiver 500 is shown as encompassing the components within the dashed lines; signals that are received by, or transmitted from, transceiver 500 as shown as lines/arrows that cross the dashed line.

Transceiver 500 can be used as either or both transmitter 104 and receiver 108. That is, either or both of transmitter 104 and receiver 108 can be replaced by transceiver 500, or they can remain as shown in FIG. 1 with AV NW 100. While the multi-functional aspect of transceiver 500 provides benefits such as versatility, transmitter 104 and receiver 108 can each be single function devices dedicated to either transmitting or receiving and comprising the elements described herein for each.

According to an embodiment, transceiver 500 can also be an endpoint in AV NW 100. An endpoint is a device that allows conversion of audio and video from one medium to another. When functioning as transmitter 104, transceiver 500 can be adapted to receive audiovisual data from source 102 over an industry standard interface such as an HDMI interface. As described above, transmitter 104 can also receive HDCP protected content from source 102 over an HDCP protected interface.

Transceiver 500 comprises HDMI/HDCP interface 202, LAN interface 204, HDMI ports 502a,b, VGA interface 504, VGA port 532, analog audio interface 506, analog audio port 534, VGA-to-HDMI converter 508, HDMI w/o HDCP interface 510, scaler 512, infra-red (IR) port 514, infra-red transceiver 516, universal serial bus (USB) interface 518, RS 232 interface 520, USB port 536, DSP module 522, 4×I$^2$S (inter IC Source) interface 524, 1×I$^2$S interface 525, 5×2 HDMI transceiver switch (HDMI transceiver) 526, system-on-chip (SoC) module 530, transistor-transistor logic (TTL) 1080 p Max interface 538, 10/100 Mbit Ethernet interface 540, FPGA 542, 10/100 Mbit Ethernet media independent interface (MII) 544, 10/100 Mbit switch 546, PHY interface 548, first and second splitters 550a,b, Ethernet courtesy port 552, HDMI Converter module 554, and 10 Gbit Ethernet port 556.

Among one of many capabilities of HDMI transceiver 526 is its ability to receive an HDCP protected HDMI signal from a video source, on HDMI/HDCP interface 202a and HDMI port 502. HDMI transceiver 526 can also output HDCP encoded video data via HDMI/HDCP interface 202b and HDMI port 502a. According to aspects of the embodiments, the AV data on HDMI/HDCP interface 202a can be encrypted or unencrypted. If the AV data is encrypted, HDMI transceiver 526 removes HDCP protection by decrypting the AV data using the session key received when authenticating with the source of the AV data (the session key is described below in greater detail in regard to FIG. 6). According to an aspect of the embodiments, HDMI transceiver 526 can be an ADV7625 5×2 HDMI Transceiver switch available from Analog Devices, Inc. of Norwood, Mass., or a similar transceiver/switch as known to those of skill in the art. HDMI transceiver 526 is substantially equivalent to HDMI transceiver 302 of transmitter 104 of FIG. 3, and HDMI transceiver 406 of receiver 108 of FIG. 4.

Transceiver 500 also comprises VGA-to-HDMI converter 508 such as an ADV7850 available from Analog Devices, or some other such similar converter. VGA-to-HDMI converter 508 converts a VGA signal received from a source 102 (which can be transmitted via VGA interface 504, along with an analog audio signal transmitted via analog audio interface 506) to a TMDS signal that is then routed to HDMI transceiver 526 via HDMI transition minimized differential signaling (TMDS) without HDCP (HDMI w/o HDCP) interface 510.

As described above, transceiver 500 also comprises DSP module 522 that is in communication with HDMI transceiver 526. According to an embodiment, DSP module 522 can be a DSP module available from Cirrus Logic of Austin, Tex. DSP module 522 is adapted for audio down-mixing. In certain applications, users desire to down-mix audio from a surround-sound format to stereo audio. As those of skill in the art can appreciate, a surround-sound system, such as a Dolby 5.1 (which is the most popular surround-sound system at present) provides six speakers (front left, front right, front center, rear left, rear right, and a sub-woofer) that essentially surrounds the intended listener. The original audio from a movie of show is processed into the distinct channels and added to the video data. However, some people watching the video may not have the surround-sound speaker systems, and so will want the audio converted to a more traditional stereo system. DSP module 522 receives the surround-sound formatted audio from HDMI transceiver 526 as a plurality of I²S streams and returns a single I²S stream. As those of skill in the art can appreciate, I²S is an electrical serial bus interface standard used for connecting digital audio devices together. It is used to communicate pulse code modulated (PCM) audio data between devices. The I²S bus separates clock and serial data signals, resulting in a lower jitter than is typical of communications systems that recover the clock from the data stream. I²S can be used for digital audio devices and technologies such as compact disc (CD) players, digital sound processors, and digital TV (DTV) sound.

Transceiver 500 further comprises first splitter 550a, such as a 1:2 splitter as shown in FIG. 5. According to an embodiment, first splitter 550a can be an EP9142 1:2 Splitter available from Explore Microelectronics of Taiwan. First splitter 550a receives a TMDS signal comprising AV data without HDCP encryption from HDMI transceiver 526 (via HDMI w/o HDCP interface 510) and transmits a TMDS signal to both FPGA 542 and scaler 512 (via HDMI w/o HDCP interfaces 510, as shown). Splitters, as those of skill in the art can appreciate, simply reproduce the input digital data signal into two, but substantially similar digital signals.

FPGA 542 conditions the received TMDS signal that comprises the audiovisual content to a format that can be encrypted using HDCP 2.x. As described below in greater detail, in regard to FIG. 7 (which, along with FIGS. 6, 8, and 9, illustrates some of the inner components of FPGA 542), one or more of the internal components of FPGA 542 conditions the audiovisual data so that it can then be routed to IP encapsulation and forward error correcting (FEC) device (IP encoder) 710, such as an SMPTE-2022-5/6 encoder, and on to an 10 gigabit (10 GBit) Ethernet MAC (10G Ethernet MAC) 726 (also shown in FIG. 7) using multicast UDP messages on a 64 bit frame IP encapsulated with FEC AV data interface (also referred to as 64 bit advanced extensible interface bus (64 bit advanced extensible interface (AXI) bus 612)). FPGA 542 is in further communication with PHY module 306, which can also be a small form-factor pluggable transceiver (SFP+). PHY module 306 interfaces with switch 106 and the remaining components of AV NW 100.

Also part of transceiver 500 is scaler 512. As those of skill in the art can appreciate, scalers convert video signals from one display resolution to another; typically, scalers are used to convert a signal from a lower resolution to a higher resolution n, a process known as "up-conversion" or "up-scaling." But scalers in general can also be used to down-scale. According to aspects of the embodiments, scaler 512 is further adapted to downscale TMDS signal for h.264 encoding. Scaler 512 is further adapted to scale the received TMDS signal to a native resolution of a corresponding AV sink 110, such as when functioning as receiver 108. According to further aspects of the embodiments, by scaling the received TMDS signal to a native resolution of sink 110, scaler 512 substantially eliminates or reduces downstream processing of the AV data. According to further aspects of the embodiments, receiver 108 can receive the native signal of the corresponding sink 110 as EDID information. As those of skill in the art can appreciate, scaling video can result in flicker effects. Flicker effects are visual artifacts in a video presentation due to adaptive layer switching. As further known to those of skill in the art, there are at least three types of flicker: noise, blur, and motion flicker.

Scaler 512 is further adapted to scale one or more received Internet Protocol multicast streams to a common resolution. As will be described later, this is a necessary step to generator locking (i.e., "genlocking") the AV data from more than one internet protocol multicast stream. As those of skill in the art can appreciate, generator locking, or genlock, is a common technique wherein the video output of one source, or a specific reference signal from a signal generator, is used to synchronize other video sources together. The aim in video applications is to ensure the coincidence of signals in time at a combining or switching point.

According to still further aspects of the embodiments, scaler 512 is adapted to maintain an authenticated connection with sink 110. Scaler 512 is still further adapted to generate video timing data during switching events. With the generated video timing data, receiver 108 can maintain an HDCP authenticated interface with sink 110 thereby reducing switching times.

Also part of transceiver 500 is SoC module 530. SoC module 530 is adapted to compress audio data using MP3, advanced audio compression (AAC), and H.2.64 and other mechanisms. MP3 is an audio coding format for digital audio that uses a form of lossy data compression. It is a common audio format for consumer audio-streaming or storage, as well as a de-facto standard of digital audio compression for the transfer and playback of music on most digital audio players. AAC is another audio coding standard for lossy digital audio compression. AAC was designed to be the successor of the MP3 format and generally achieves better sound quality than MP3 at similar bit rates.

H.264 (or MPEG-4 Part 10, advanced video coding (MPEG-4 AVC)) is a video compression format that is currently one of the most commonly used formats for the recording, compression, and distribution of video content. As those of skill in the art can appreciate, H.264/MPEG-4 AVC is a block-oriented motion-compensation-based video compression standard developed by the ITU-T Video Coding Experts Group (VCEG) together with the ISO/IEC JTC1 Moving Picture Experts Group (MPEG). H.264 is known as being one of the video encoding standards for Blu-ray Discs; all Blu-ray Disc players must be able to decode H.264. It is also widely used by streaming internet sources, such as videos from Vimeo, YouTube, and the iTunes Store, web software such as the Adobe Flash Player and Microsoft Silverlight, and also various HDTV broadcasts over terrestrial (ATSC, ISDB-T, DVB-T or DVB-T2), cable (DVB-C), and satellite (DVB-S and DVB-S2). H.264 is typically used for lossy compression in the strict mathematical sense, although the amount of loss may sometimes be imperceptible. It is also possible to create truly lossless encodings using it, for example, to have localized lossless-coded regions within lossy-coded pictures or to support rare use cases for which the entire encoding is lossless.

SoC module 530 is in communication with 10/100 Mbit switch 546 via 10/100 Mbit Ethernet interface 540, through which SoC module 530 communicates with FPGA 542, and then to switch 106. SoC module 530 is also in communication with Ethernet courtesy port 552 via 10/100 Mbit Ethernet interfaces 540 and 10/100 Mbit switch 546. SoC module 530 further communicates with infrared (IR) transceiver 516 via USB interface 518. SoC module 530 is further adapted to receive and generate RS232 signals, which it can receive/transmit on RS232 interface 520 and RS232 port 536.

Attention is directed to FIG. 9, which illustrates detailed block diagram of scaler 512. According to an aspect of the embodiments, scaler 512 is adapted to generate image content data. For example, scaler 512 can generate a repeated frame of image content data, such as a repeated frame of video, during switching discontinuities. Sink 110 can then receive the image content data and present an aesthetically pleasing switch according to aspects of the embodiment in which make-before-break transitions cannot be made.

Scaler 512 comprises input scaling block 902, frame rate processing block 906, memory/framer buffer (memory) 910, and output scaling block 908. Scaler 512 receives input audiovisual data video timing data and image content data (received as input audio visual data that is configured as HDMI signal without HDCP interface 510). Frame rate processing block 906 is adapted for receiving asynchronous input video timing data from input scaling block 902, and writing the incoming image content data into memory 910.

Frame rate processing block 906 is further adapted for receiving the free-running output video timing data from free-running output timing generator 904, and reading incoming video data from memory 910 as required by the output resolution of scaler 512 (i.e., native resolution of sink 110). Frame rate processing block 906 is further adapted for performing frame rate conversion if the input refresh rate and the output refresh rate of the audiovisual data differ.

Input scaling block 902 is adapted for receiving the asynchronous input video timing data and performing scaling if required. According to different aspects of the embodiments, depending on the input and output setup, input scaling can be performed before frame rate processing. According to other aspects of the embodiments, output scaling can be performed subsequent to frame rate processing. In these applications, output scaling block 908 receives the free running output video timing data and performs scaling as required. According to still further aspects of the embodiments, one or both of input scaling and output scaling can occur via input scaling block 902 and output scaling block 908. Free running output timing generator 904 is further adapted for substantially continuously generating free running output video timing data used to give downstream video sink 110 a fixed resolution. As those of skill in the art can appreciate, scaling down prior to frame rate processing reduces the memory bandwidth requirements, while scaling down afterwards will increase the memory bandwidth requirements.

According to aspects of the embodiments in which scaler 512 generates audiovisual data comprising a repeated frame of image content data (e.g., when switching between at least two sources 102), the last frame of video received by scaler 512 (i.e., the frame to be repeated from first source 102a) is repeatedly read from memory 910 and output by scaler 512. When scaler 512 achieves scaler-lock with audiovisual data from second source 102b, a frame of image content data from audiovisual data received from second source 102b is read from memory 910 and output by scaler 512.

Referring again to FIGS. 5 and 9, scaler 512 outputs the scaled TMDS signal via HDMI w/o HDCP interface 510 to second splitter 550b, such as the 1:2 splitter shown in FIG. 5. According to an embodiment, second splitter 550b can be an EP9142 1:2 Splitter available from Explore Microelectronics of Taiwan. Second splitter 550b splits the output of scaler 512 (scaled AV data) to be received by both HDMI transceiver 526 (via HDMI w/o HDCP interface 510) and HDMI converter module 554 (also via HDMI w/o HDCP interface 510). The scaled AV data output to HDMI transceiver 526 is then output to sink 110 from HDMI transceiver 526 via HDMI with HDCP interface 202b. Such scaled AV data output from scaler 512 can be AV data transmitted from receiver 108 at the native resolution to sink 110.

HDMI converter module 554 receives the scaled and split HDMI signal via HDMI w/o HDCP interface 510, converts the received HDMI/TMDS into a TTL signal, and transmits the TTL signal to SoC module 530. According to an embodiment, SoC module 530 can be an ARM SoC, designed by ARM of Great Britain. SoC module 530 further comprises an encoder, such as h.264 encoder and a decoder, such as an h.264 decoder. According to further aspects of the embodiments, the encoder can be an h.265 encoder and h.265 decoder, a JPEG2000 encoder and decoder, or an MJPEG encoder and decoder, among other types of encoders and decoders. The h.264 encoder is adapted for compressing AV data according to the h.264 video compression standard for transmission on AV NW 100. The h.264 decoder is configured for decoding AV data compressed according to the h.264 video compression standard. The h.264 decoder can be employed to decode compressed AV data for transmission on an AV interface to sink 110 such as an HDMI interface. According to an embodiment, the encoding and decoding functions are performed by an FPGA within HDMI converter module 554. SoC module 530 can also encrypt received signal with HDCP, and can therefore transmit AV signals via HDMI/HDCP interface 202 to HDMI transceiver 526

Attention is now directed to FIG. 6. FIG. 6 illustrates a detailed functional block diagram of first portion processing block 600 of FPGA 542 of transceiver 500 as shown in FIG. 5 according to an embodiment. First portion processing block 600 of FGPA 542 shown in FIG. 6 comprises TMDS decoder 606, data formatter and framer 608, AXI bus 612, AES encryption module 614, and several different input, intermediate, and output signals, all of which are described in greater detail below.

First portion processing block 600 of FPGA 542 of transceiver 500 as shown in FIG. 6 conditions the TMDS signal comprising the audiovisual content, and received via HDMI w/o HDCP interface 510, to a format that can be encrypted using HDCP 2.x. First portion processing block 600 as shown in FIG. 6 provides a substantially seamless interface between the balance of FPGA 542 and HDMI transceiver 526. According to further aspects of the embodiments, First portion processing block 600 of FPGA 542 shown in FIG. 6 provides TMDS clock alignment, TMDS character detection, TMDS de-skewing, TMDS decoding to separate image content data signals 604 (i.e., red-green-blue (RGB) signal 604a), and generation of auxiliary data and video timing data signals (i.e., video synchronization signal 604b, video control signal 604c, auxiliary data 604d, and video clock 604e). Several of these functions are performed by TMDS decoder 606 along with data formatter and framer 608.

As described previously, HDMI transceiver 526 receives AV data over a plurality of interfaces, including a plurality of HDMI interfaces. According to aspects of the embodiments, the received AV data can be encrypted (HDMI/HDCP interface 202) or unencrypted (HDMI without HDCP interface 510). If the AV data is encrypted, HDMI transceiver 526 can remove HDCP protection by decrypting the AV data using the session key received when authenticating with the source of the AV data, in the manner as described above.

The newly unencrypted AV data can then be transmitted from HDMI transceiver 526 as a TMDS signal to FPGA 542 over HDMI w/o HDCP interface 510. First portion processing block 600 of FPGA 542, as shown in FIG. 6, comprises TMDS decoder 606 that receives the TMDS signal, and decodes, extracts, and outputs separate image content data signals (RGB signal 604a), video timing data (i.e., video synchronization signal 604b), video control signal 604c, auxiliary data signal 604d, and video clock signal 604e to data formatter and framer module 608.

Data formatter and framer module 608 further comprises a first-in-first-out (FIFO) buffer 610. Data formatter and framer module 608 receives AXI clock 602 from a phase lock loop circuit, not shown in the Figures. Data formatter and framer module 608 is adapted for tagging various data types and packing the data into 128 bit words. FIFO buffer 610 (or alternatively a dual port random access memory (RAM)) is adapted for "crossing the clock domain" prior to AES encryption. As those of skill in the art can appreciate, the function of "crossing the clock domain" entails referencing the video data from a first clock to a second clock. In this case, video clock 604e clocks the data into data formatter and framer 608, and AXI clock 602 clocks the data out of data formatter and framer 608 and into FIFO buffer 610 (and is used in subsequent processing, such as in AES encryption module 614). As those of skill in the art can further appreciate, video clock 604e is obtained from the network transmitted video data, and so is affected by the same jitter problems as the video data itself, meaning that it is not necessarily fixed and stable. AXI clock 602, however, while asynchronous to video clock 604e, is substantially fixed and stable, and thus assists or facilitates a consistent manner of clocking the video data from this point on. The output of FIFO buffer 610 is transmitted via AXI bus 612 to AES encryption module 614.

Two signals are also output by data formatter and framer 608: video synchronization (Vsync) signal 618 and video info 620. According to aspects of the embodiments, Vsync 618 is extracted by data formatter and framer 608 from TMDS decoder 606 information, and represents the start of a frame boundary. Video Info 620 is also extracted by data formatter and framer 608 and represents the image size, among other things pertaining to the video data, as discussed below. Use of both Vsync 618 and Video info 620 are discussed below.

AES encryption module 614 is adapted to implement two components of HDCP authentication: HDCP key exchange and AES-128 encryption. AES encryption module 614 also receives AXI clock 602, and further receives private encryption key 616, which is received Digital Content Protection Inc., the licensor of HDCP, through an internal or external source. As known to those of skill in the art, each HDCP device has a unique set of private keys, along with a public key. Private encryption key 616 is received by AES encryption module 614 which contains an algorithm to convert the private key into a public key. AES encryption module 614 then sends a message with the public key to the receiver, and expects the receiver to return its public key. The transmitter—in this case AES encryption module 614—verifies the validity of the received public key and calculates a secret key. The receiver also generates its own secret key; these are never transmitted, but need to match. These are used to generate a message that is transmitted and the receiver, using its hopefully matching secret key, receives it and verifies that it would match a message that it would generate using the same secret key. If they match, then a valid HDCP interface has been established. As those of skill in the art can appreciate, this description is brief, and does not provide all of the details, in fulfillment of the dual purposes of clarity and brevity. Additional information regarding the HDCP encryption procedure can be found in a document entitled, "High Bandwidth Digital Content Protection System; Interface Independent Adaptation," revision 2.1, 18 Jul. 2011, DCP LLC and Intel Corporation.

According to aspects of the embodiments as shown in FIG. 6, AES encryption module 614 employs AES encryption in 128 counter (CTR) mode, to output AES encrypted uncompressed video on AXI bus 612. As those of skill in the art can appreciate, in cryptography, a mode of operation is an algorithm that uses a block cipher to provide an information service such as confidentiality or authenticity. A mode of operation describes how to repeatedly apply a cipher's single-block operation to securely transform amounts of data larger than a block. Counter mode turns a block cipher into a stream cipher. It generates the next keystream block by encrypting successive values of a "counter." The counter can be any function that produces a sequence that is guaranteed not to repeat for a long time, although an actual increment-by-one counter is the simplest and most popular.

Attention is now directed towards FIG. 7. FIG. 7 illustrates a detailed functional block diagram of second portion processing block 700 of FPGA 542 of transceiver 500 as shown in FIG. 5 according to an embodiment. Second portion processing block 700 of FPGA 542 of transceiver 500 that is shown in FIG. 7 performs, among other functions, an encapsulation and FEC function in regard to the AV data in transceiver 500 according to an embodiment. Second portion processing block 700 of FPGA 542 of transceiver device 500 as shown in FIG. 5 comprises payload assembly/header insertion (payload assembler) module 706, IP encoder 710, 10 Gbit Ethernet MAC 726, and serializer-deserializer (SERDES) 728.

Payload assembler module 706 receives encrypted AV data from the first portion processing block 600 via AXI bus 612 and encodes the data for transmission throughout AV NW 100. Payload assembler module 706 also received unencrypted AV data via HDMI w/o HDCP interface 510. The encrypted AV data is routed from payload assembler module 706 to IP encoder 710 via AXI bus 612, wherein the encrypted AV data is encapsulated according to IP protocols and forward error correction algorithms are performed. According to further embodiments, IP encoder 710 can be an SMPTE-2022-5/6 encoder. The IP encapsulated, unencrypted AV data is then forwarded to 10 Gbit Ethernet MAC using multicast UDP messages via AXI bus 612.

As mentioned above, payload assembler module 706 is further adapted for receiving uncompressed AES encrypted AV data (via AXI bus 612) as well as uncompressed and unencrypted AV data (via HDMI w/o HDCP interface 510) and assemble the data into 64 bit words for presentation to IP encoder 710. In presenting the IP encapsulated data, payload assembler module 706 inserts an additional payload header at predetermined intervals. The additional payload header comprises video standard information such as image dimensions, frame rate, and the pixel clock. The image dimensions can be obtained from the video info signal 620; the frame rate information can be obtained from the Vsync signal 618; and the pixel clock can be obtained from the output of timestamp module 704 that generates a timestamp on pixel clock 702. According to an embodiment, the timestamp information can be used by receiver 400 in a clock recovery algorithm, and the remainder of the video standard information can also be used at receiver 400.

According to still further aspects of the embodiments, the timestamp of as imparted by timestamp module 704 can be employed to transition from a compressed version of AV data to an uncompressed version. That is, the timestamp is utilized by receiver 108 to synchronize a compressed version of AV data with an uncompressed version of AV data. By synchronizing the two streams according to matching time stamps, receiver 108 can output a seamless transition between the two streams. According to an embodiment, FPGA 542 can receive both an AES encrypted signal comprising compressed AV data and an AES encrypted signal comprising uncompressed AV data and processes both for transmission on AV NW 100.

Payload assembler module 706 outputs assembled AV data to IP encoder 710 via 64 bit AXI bus 612 for IP encapsulation and forward error correction FEC). According to aspects of the embodiments, IP encoder 710 can be a 10G SMPTE-2022-5/6 encoder. SMPTE-2022-5 is a standard for the transport of high bitrate media over IP networks. SMPTE-2022-6 is a standard for forward error correction for high bitrate media transport over IP networks. IP encoder 710 encapsulates the payload (AV) data from payload assembler module 706 into RTP/UDP/IP packets and optionally generates and transmits forward error correction packets. IP encoder 710 is scalable to multiple channels allowing transmitter 104 to transmit more than one channel of audiovisual data and additional non-AV data. According to aspects of the embodiments, the output of IP encoder 710 can be characterized as 64 bit frame IP encapsulated with FEC AV data.

While IP encoder 710 is shown as an SMPTE-2022-5/6 encoder and described herein as an SMPTE-2022-5/6 encoder, IP encoder 710 is not limited to an SMPTE-2022-5/6 encoder. In other embodiments, IP encoder 710 can encapsulate the packets according to the real-time transport protocol (RTP) or MPEG-2 transport stream (TS) protocol. IP encoder 710 encoder is communicatively coupled to external (RAM) 716, such as an external synchronous dynamic random access memory (SDRAM) double data rate type three (DDR3), via external RAM databus 718.

IP encoder 710 is further adapted for queuing generic Ethernet traffic for transmitted and receiving generic Ethernet packets from a 10 Gbit link. IP encoder 710 communicates with a media independent interface (MII) to memory mapped interface (MMI) module (MII-to-MMI module) 732 to provide a path from the host processor or local Ethernet switch to the 10G link. As shown in FIG. 7, MII 544 comprises the interconnects between 10/100 Mbit switch 546 and MII-to-MMI module 732, and the interconnects between MII-to-MMI module 732 and IP encoder 710. MII 544 transmits and receives Ethernet traffic via Ethernet courtesy port 552.

IP encoder 710 outputs IP encapsulated encrypted AV data (both compressed and uncompressed) to 10 Gbit Ethernet MAC 726 via 64 bit AXI bus 612. 10 Gbit Ethernet MAC 726 further comprises SERDES 728. Encapsulated, serialized, and encrypted AV data 730 is output to 10 Gbit PHY module 306, which completes the modification of the AV data to be put on LAN interface 204. According to aspects of the embodiments, the combination of devices 710, 726, and 306 provides the functions of: (a) creating frame boundary delimitation and frame synchronization for the AV data; (b) handling of source and destination addresses; (c) error detection in regard to physical medium transmission errors; (d) media access management; (e) medium allocation in the form of collision avoidance; and (f) contention resolution.

As shown in FIG. 7, FPGA 542 further comprises host CPU interface 724 in communication with external host processor 720. According to aspects of the embodiments, external host processor 720 can be a processor in the STM32 family available from STMicroelectronics of Geneva, Switzerland. Host CPU interface 724 performs substantially as a transceiver for external host processor 720, and communicates with external host processor 720 via processor bus 722, and substantially all of the components of FPGA 542 as shown by interface 734. In addition, 156 MHz clock 712 is used by modules 706, 710, and 726.

The apparatus of FIG. 5 can be used as both a transmitter and receiver, notwithstanding that the discussion of FPGA 542 has been in the context of a transmitter. FIG. 8, discussed below, focuses on recovering a clock that is necessary for proper operation of transceiver 500 as a receiver (particularly receiver 108); As those of skill in the art can therefore appreciate, transceiver 500 can receive data at PHY module 306 on LAN interface 204 (in FIG. 7), and proceed from right to left.

FIG. 8 illustrates a detailed functional block diagram of phase lock loop (PLL) and clock generator of FPGA 542 of transceiver 500 (clock recovery circuit) 800 according to an embodiment. Clock recovery circuit 800 shown in FIG. 8 illustrates the clock recovery function of transceiver 500 according to an aspect of the embodiments. Clock recovery circuit 800 is principally used when transceiver 500 functions as receiver 108. When transceiver 500 functions as receiver 108, the AV data that is contained in the encapsulated and encrypted received stream is obtained by reversing the encapsulation and encryption process (i.e. de-encapsulation and decryption of the received Ethernet frames). According to further aspects of the embodiments, the same AV data can also be compressed, or not, and a decompression algorithm can also be used to decompress the received AV data. As its name implies, the purpose of clock recovery circuit 800 is to obtain, or recover, the video data clock that is inherently transmitted along with the video data through the network. The net output of clock recovery circuit 800 is pixel clock 702. Pixel clock 702 is the clock that, once generated, can be used to click the individual pixel data as lines and then frames of video data for further synchronized processing in a receiver and subsequent sink. It is this pixel clock recover circuit 800 and associated processing that takes jittery network transmitted video data and produces substantially jitter free video data that can be displayed for viewing with little or no process and/or transmission artifacts or errors.

Clock recovery circuit 800 comprises video data buffer 802, which is connected to moving average filter 806 via video data buffer level indicator (buffer level indicator) 804. Recovered video stream is received by video data buffer 802 in bursts due to jitter over the network. One purpose of video data buffer 802 is to facilitate the generation of a clock that can be used to process the video data and make it less jittery over time. This means that the flow of video data is smoother, more consistent, and can be used to generate high quality video signals.

Buffer level indicator 804 is a signal that indicates the level of the buffer of video data; according to aspects of the embodiments, an optimum level of performance is achieved when buffer level indicator 804 is about 50%. According to aspects of the embodiments, moving average filter 806 averages buffer level indicator 804 over ten buffer read enable cycles. According to further aspects of the embodiments, different numbers of buffer read enable cycles can be used to determine the average of the buffer level indicator 804. The output of moving average filter 806, moving average filter output 808, is connected to format converter 810. Format converter error output 812 sends the converted signal to second order low pass filter (LPF) 816, which also receives as an input loop gain G 814, and outputs its signal via LPF 816 output 818 to control logic 820. The output of control logic 820, control logic output 836, is connected to phase locked loop (PLL) circuit 822. PLL circuit 822 receives as an input the output of programmable clock generator 830, reference clock 838. Programmable clock generator 830 receives as an input I2C configuration signal 832. PLL output clock 824 is sent to clock divider 826 and jitter cleaner 828. Jitter cleaner 828 also receives as in input I2C configuration signal 832. Clock divider 826 generates divided clock output 834 that is sent to video data buffer 802 and moving average filter 806. Divided clock output 834 is used by video data buffer 802 to dump the video data within the buffer, and to generate the output of moving average filter 806 (i.e., moving average filter 806 counts the number of pulses of divided clock output 834, and generates an average value every ten pulses).

Video data buffer 802, as part of clock recovery portion circuit 800, receives AV data over LAN interface 204, and facilitates circuit 800 to match the received video data rate (see, FIG. 6, and video clock 604e) with the recovered pixel clock rate, embodied as pixel clock 702. As those of skill in the art can appreciate, a pixel clock rate is the speed at which the pixels are transmitted such that a full frame of pixels fits within one refresh cycle.

As described above, moving average filter 806 receives buffer level indicator 804. As those of skill in the art can appreciate, moving average filter 806 averages the value represented by buffer level indicator 804 over a number of samples and feeds the average to format converter 810 as moving average filter output 808. According to aspects of an embodiment, moving average filter 806 averages buffer level indicator over ten samples, although different numbers of samples can also be used. The output of moving average filter 806, moving average filter output 808, therefore represents a smoothed or averaged version of buffer level indicator 804.

The output of moving average filter 806 is then presented to format converter 810 as moving average filter output 808. Format converter 810 processes the now-smoothed buffer level indicator 804 to a mapped control signal, which is then input to LPF 816. LPF 816 passes only the low frequency components of the output of format converter 810. 156 MHz clock 712 is used by each of modules/circuits 806, 810, 816, and 820.

LPF 816 can be implemented as a second order LPF. According to aspects of the embodiments, second order loop filter 1230 has a cutoff frequency of about 1.25 MHz. The output of LPF 816 is low-pass filtered error signal (filtered error signal) 818 that is then sent to control logic 820. Control logic 820 generates control signals and outputs control logic output 836 to PLL circuit 822 to create PLL output clock 824. According to aspects of the embodiments, control logic 820 converts filtered error signal 818 into a pulse width modulated (PWM) signal that is further filtered (not shown) to become the control voltage of a programmable voltage controlled crystal oscillator (VCXO) clock generator that is part of PLL circuit 822. According to aspects of the embodiments, generation of PLL controls signals are well known to those of skill in the art and therefore, in fulfillment of the dual purposes of clarity and brevity, a detailed discussion thereof has been omitted from this discussion.

PLL circuit 822 also receives as an input reference clock 838, which is the clock signal generated by programmable clock generator 830 in response to data and commands received via I2C configuration signal 832. Reference clock 838 is a clock signal that has a frequency that is dependent upon the received video resolution. Thus, the received video resolution is obtained and put onto the I2C bus, and input to programmable clock generator 830 to be used to generate input reference clock 838. In other words, input reference clock 838 is an estimation of a clock that is used to generate pixel clock 702 via clock recovery circuit 800.

As those of skill in the art of PLL design can appreciate, when the reference clock is input to PLL circuit 822, it acts to adjust and "pull in" the frequency of reference clock 838 to be substantially similar to that of the required pixel clock frequency. As those of skill in the art can further appreciate, while PLL circuits can be substantially precise in adjusting clock frequencies, there will be a first range of frequencies of the output clock signal, which in this case is PLL output clock 824. This first range of frequencies makes allowance for the frequency error of programmable clock generator 830 and the original pixel clock as found in the recovered AV data stream as received on LAN interface 204 according to aspects of the embodiments.

As shown in FIG. 8, PLL output clock 824 is transmitted to clock divider 826 where it can be divided down by a factor of 1 to N, wherein, according to aspects of the embodiments, N equals 64, but can be as high as 256, 512, 1024, among other divide-by factors (or less than 64, as the case may be). The output of clock divider 826 is divided clock output 834. Divided clock output 834 enables video data buffer 802 to read the AV data received on LAN interface 204, and close the recovery timing loop. According to further aspects of the embodiments, divided clock output 834 matches the video frame rate of AV data received on LAN interface 204.

According to further aspects of the embodiments, PLL output clock 824 is also transmitted out of FPGA 542 to jitter cleaner 828. Jitter cleaner 828 receives both PLL output clock 824 and data/commands from I2C configuration signal 832. The output of jitter cleaner 828 is sent back to FPGA 542 and received by pixel clock generator 840, which generates pixel clock 702 (shown and used in FIG. 7). Jitter cleaner 828 is located in a different portion of transceiver 500. Jitter cleaner 828 helps remove any last vestiges of jitter that might remain in the output of PLL circuit 822, PLL output clock 824.

According to an embodiment, audiovisual network administrators can configure AV NW 100 through a dedicated software configuration tool (configuration tool) stored locally or accessed via a web interface. The network administrator can access the configuration tool via a personal computer, laptop computer, tablet, mobile phone or any other portable electronic device. The configuration tool, or Digital Media (DM) tool, is a tool or software application that can be used by an operator to monitor and change aspects of the operation of different portions of the network. By way of a non-limiting example, the configuration tool can facilitate the manual insertion of EDID information regarding a source, or sink. Other uses are possible according to further aspects of the embodiments.

The configuration tool can provide an introspective look into digital video distribution systems that includes, among other features, a detailed view of advanced source and display information, source-select functions, and system topology views. According to further aspects of the embodiments, the configuration tool is a resource for deploying and troubleshooting audiovisual distribution networks such as AV NW 100.

According to aspects of the embodiments, the configuration tool can use graphical user interfaces to represent the hardware that the tool can access through network interfaces. According to further aspects of the embodiments, inputs are shown on the left, outputs on the right, and transceiver devices are connected via colored lines with text stating resolution, connection and HDCP status. Functions or greater signal detail can be displayed by simply hovering over different parts of the system with a pointer controlled by a mouse device, or equivalent.

The configuration tool can further provide one or more interfaces to reorder inputs and outputs in AV NW 100. According to an aspect of the embodiments, the configuration tool provides a graphic user interface adapted to provide the ability to drag-and-drop symbols that represent features and functions in a manner known to those of skill in the art. The configuration tool can also provide an interface geared toward experienced users based on a grid that allows for minimal keystrokes.

According to aspects of the embodiments, AV NW 100 further implements one or more methods for automatically visualizing the network topology. The network switch can then mine this information from address resolution protocol (ARP) tables and provide it to the configuration tool for visual display.

As represented through the configuration tool, each transceiver device can include a dropdown box used for selecting the input to be routed. This quick-route tool aids in testing sources during system commissioning. Setup buttons on each of transmitter 104 and receiver 108 brings the user to additional menus that can be organized in a convenient tabbed format. Transmitter 104 menus provide EDID setup, HDCP testing, test signal generation, and other advanced features; receiver 108 menus provide a means to adjust cable type and enable deep color support. Transmitters 104 can also have their own setup screens allowing adjustments to incoming source signals. Receivers 108 views present resolution, cable length, HDCP, and routing data, among other types of set up screens. Through use of the configuration tool, users can quickly identify signal behaviors and take action to remedy unwanted results.

As can be appreciated by those of skill in the art, and as discussed above, EDID is a crucial part of digital AV signals. According to aspects of the embodiments, therefore, the configuration tool can provide the ability to view, manage, and/or manually edit EDID. In addition to video resolution, refresh rate, and format information, the configuration tool can supply audio information such as number of channels, resolution, format, among other types of information.

The configuration tool further provides additional features that allow EDID copying from a display so that it can be applied to a set group of sources 102. One such feature is an advanced button for deep color that exposes compatible resolutions that work within the deep color guidelines. Another such feature is audio selection. When using the audio selection feature and choosing "Best Common," an audio format is selected that is compatible with all selected displays. Another feature available with audio selection is "Best Overall," which provides integrators of AV NW 100 the choice of audio format regardless of downstream device support.

According to further aspects of the embodiments, the configuration tool can further include simple network management protocol(s), and can interface with the Fusion Building Management software program that is available from Crestron Electronics, Inc. of Rockleigh, N.J.

As described above, encoding processes are discussed in reference to FIG. 14-16. The encoding processes are not meant to limit the aspects of the embodiments, or to suggest that the aspects of the embodiments should be implemented following the encoding process. The purpose of the encoding processes described herein are to facilitate the understanding of one or more aspects of the embodiments and to provide the reader with one or many possible implementations of the processed discussed herein. FIGS. 14-16 illustrate flowcharts of various steps performed during the encoding process. The steps of FIGS. 14-16 are not intended to completely describe the encoding process but only to illustrate some of the aspects discussed above.

INDUSTRIAL APPLICABILITY

To solve the aforementioned problems, the aspects of the embodiments are directed towards systems, modes, and methods for transmission of digital media over internet protocol networks, wherein two or more uncompressed streams of video data from two or more different sources can be substantially synchronized such that switching can occur substantially seamlessly with little or no degradation in audio/video quality.

The disclosed embodiments provide a system, software, and a method for switching between two or more uncompressed sources of audio/video data such that little or no degradation of the perceived quality of the audio/video signal occurs. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A network system for distributing audiovisual data, comprising:
   two or more audio sinks, each of the two or more audio sinks having a corresponding audio format capability;

a first and second source, the first source being adapted to generate and output audiovisual data via a first audio stream and the second source being adapted to generate and output audiovisual data via a second audio stream, wherein
  each of the first and second audio streams comprising audio data formatted according to a first audio format capability and a second audio format capability, respectively, and wherein
  the first source is further adapted to output the first audio stream according to a first transmission protocol, and
  the second source is further adapted to output the second audio stream according to a second transmission protocol; and
a first transmitter adapted to receive the first and second outputted audio streams from the first source via the first transmission protocol and from the second source via the second transmission protocol, and wherein
  the first transmitter is further adapted to generate one or more audio streams and transmit the same after converting the received first and second audio streams from the first transmission protocol and the second transmission protocol to an internet protocol (IP), and wherein
  each of the one or more generated audio streams include audio data formatted according to an audio format capability that
    (a) is compatible with the audio format capability of the respective audio sink to which it is being transmitted to, and
    (b) takes into account and minimizes bandwidth usage of a channel of the network system between the first transmitter and the respective audio sink.

2. The network system according to claim 1, wherein the network system is an Ethernet network system.

3. The network system according to claim 1 further comprising:
  a switch adapted to receive the one or more audio streams, and wherein
    the switch is further adapted to be directed to transmit the received one or more audio streams to the one or more audio sinks.

4. The network system according to claim 1, wherein the audio formats are selected from the group consisting of Dolby Atmos (128 channels; 64×2), Dolby Digital 5.1, Dolby Digital 6.1 EX, Dolby Digital 7.1Plus (lossy), Dolby Digital 7.1 TrueHD (lossless), Dolby Pro Logic, Dolby Pro Logic II, Dolby Pro Logic IIX 5.1 to 6.1/7.1, Dolby Pro Logic IIZ 5.1 to 6.1/7.1, DTS 6.1 Discrete, DTS 6.1 Matrix, DTS 7.1 HD (lossy), DTS 7.1 Master HD (lossless), Mono, and Stereo audio formats.

5. The network system according to claim 1, wherein the first transmission protocol is one of a high definition multimedia interface (HDMI) transmission protocol, a DisplayPort transmission protocol, and an Sony/Philips digital interface format (S/PDIF) transmission protocol.

6. The network system according to claim 1, wherein the first transmission protocol uses an advanced encryption standard (AES) as an encryption protocol.

7. The network system according to claim 1, wherein the transmitter is further adapted to determine an audio format capability for each of one or more audio sinks that can receive audio streams from the transmitter.

8. The network system according to claim 1, wherein the transmitter is further adapted to generate and transmit a first audio stream formatted according to a first audio format capability, and wherein
  the first audio format capability is the same audio format capability as was generated and output by the first source.

9. The network system according to claim 7, wherein the transmitter is still further adapted to interrogate each of the one or more audio sinks that can receive audio streams from the transmitter as to their respective audio format capability.

10. The network system according to claim 7, wherein the transmitter is still further adapted to receive a communication from each of the one or more audio sinks as to their respective audio format capability.

11. The network system according to claim 8, wherein the transmitter is still further adapted to generate and transmit a second audio stream formatted according to a second audio format capability, and wherein
  the second audio format capability is a different audio format capability as was generated and output by the first source.

12. A method for distributing audiovisual data in a network, comprising:
  generating and outputting a first audio stream with audio data formatted according to a first audio format capability from a first source using a first transmission protocol;
  generating and outputting a second audio stream with audio data formatted according to a second audio format capability from a second source using a second transmission protocol;
  receiving the first and second audio streams via the first transmission protocol and second transmission protocol, respectively, at a transmitter;
  generating one or more audio streams based on the received audio stream by the transmitter; and
  transmitting the one or more audio streams by the transmitter after converting the first and second received audio streams from the first and second transmission protocols to an internet protocol (IP), wherein
    each of the one or more audio streams includes audio data formatted according to an audio format capability compatible with an audio format capability of an audio sink to which it is being transmitted to, and further wherein
    taking into account, and minimizing, bandwidth usage of the network system between the first transmitter and the respective audio sink when selecting the compatible audio format capability.

13. The method according to claim 12, further comprising:
  determining, by the transmitter, an audio format capability for each of one or more audio sinks that can receive audio streams from the transmitter.

14. The method according to claim 12, further comprising:
  receiving, at a switch, the transmitted one or more audio streams of an audio format capability compatible with an audio format capability of the audio sink to which it is being transmitted to, at a switch, wherein the switch is adapted to transmit the received one or more audio streams to one or more receivers;
  receiving the one or more audio streams at respective one or more receivers, wherein each of the respective one or more receivers is adapted to forward the received audio streams to an associated audio sink; and receiving the audio stream at the associated audio sink.

15. The method according to claim 12, wherein the network is an Ethernet network.

16. The method according to claim 12, wherein
the audio formats are selected from the group consisting of Dolby Atmos (128 channels; 64×2), Dolby Digital 5.1, Dolby Digital 6.1 EX, Dolby Digital 7.1Plus (lossy), Dolby Digital 7.1 TrueHD (lossless), Dolby Pro Logic, Dolby Pro Logic II, Dolby Pro Logic IIX 5.1 to 6.1/7.1, Dolby Pro Logic IIZ 5.1 to 6.1/7.1, DTS 6.1 Discrete, DTS 6.1 Matrix, DTS 7.1 HD (lossy), DTS 7.1 Master HD (lossless), Mono, and Stereo audio formats.

17. The method according to claim 12, wherein
the first transmission protocol is one of a high definition multimedia interface (HDMI) transmission protocol, a DisplayPort transmission protocol, and an Sony/Philips digital interface format (S/PDIF) transmission protocol.

18. The method according to claim 12, wherein
the first transmission protocol uses an advanced encryption standard (AES) as an encryption protocol.

19. The method according to claim 12, wherein the step of transmitting comprises:
transmitting a first audio stream formatted according to a first audio format capability, and wherein
the first audio format capability is the same audio format capability as was generated and output by the first source.

20. The method according to claim 13, wherein the step of determining comprises:
interrogating each of the one or more audio sinks that can receive audio streams from the transmitter as to their respective audio format capability.

21. The method according to claim 13, wherein the step of determining comprises:
receiving a communication from each of the one or more audio sinks as to their respective audio format capability.

22. The method according to claim 21, wherein the step of transmitting comprises:
transmitting a second audio stream formatted according to a second audio format capability, and wherein
the second audio format capability is a different audio format capability as was generated and output by the first source.

* * * * *